United States Patent [19]
Drori et al.

[11] Patent Number: 4,997,053
[45] Date of Patent: Mar. 5, 1991

[54] REMOTE CONTROL VEHICLE SEAT AND STEERING WHEEL POSITIONING SYSTEM

[75] Inventors: Ze'ev Drori, Los Angeles; Moti Segal, Chatsworth, both of Calif.

[73] Assignee: Clifford Electronics, Inc., Chatsworth, Calif.

[21] Appl. No.: 480,747

[22] Filed: Feb. 15, 1990

[51] Int. Cl.⁵ .......................... B60R 25/00; B62H 5/00
[52] U.S. Cl. ..................................... 180/287; 180/289; 180/268
[58] Field of Search ................. 180/167, 287, 289, 268

[56] References Cited

U.S. PATENT DOCUMENTS

| | | | |
|---|---|---|---|
| 4,236,594 | 12/1980 | Ramsperger | 180/167 |
| 4,674,454 | 6/1987 | Phair | 180/167 |
| 4,740,775 | 4/1988 | Price | 180/287 |
| 4,754,255 | 6/1988 | Sanders et al. | 304/64 |
| 4,811,013 | 3/1989 | Akutsu | 180/287 |
| 4,928,778 | 5/1990 | Tin | 180/167 |

*Primary Examiner*—Kenneth R. Rice
*Attorney, Agent, or Firm*—Roberts and Quiogue

[57] ABSTRACT

A system is disclosed for remote control of a driver's seat in a vehicle equipped with powder seats but without memory seats function. The system is controlled by remote RF transmitter and auto security system which are responsive to a remote control signal disarming the system. Upon receipt of such signal the system will position the driver's seat on a preselected mode to either initial easy access position or a driver position corresponding to the particular transmitter code. In the event an intrusion is detected while the security system is armed, the system automatically moves the driver's seat to an alarm position closest to the vehicle's dashboard to make it difficult or impossible for an intruder to drive the vehicle.

39 Claims, 22 Drawing Sheets

REMOTE CONTROL VEHICLE SEAT AND STEERING WHEEL POSITIONING SYSTEM

BACKGROUND OF THE INVENTION

The present invention relates to power operated vehicle seat and steering wheel positioning systems.

Power operated seats have long been employed in many vehicles. These seats typically allow the vehicle driver or passengers to position the seat to particular desired comfortable positions. Several electric motors are typically used to position the seat through particular adjustment ranges. Depending on the number of electric motors in the vehicle's seat, the seat may be moved forward or backward, up or down, raise one end while lowering the other, and the seat back incline may be also adjusted, as well as the headrest. Power operated steering wheel positioning systems have also been used in some vehicles permitting extension and retraction of the steering wheel toward or away from the driver. Switches located on either the vehicle door, instrument panel or console permit the driver or passenger to adjust the seat and steering wheel positioning as desired.

Some vehicles further include position memories allowing the driver to store one or more desired seat or steering positions in the memory. To select the desired position, the user actuates a memory switch after opening the door or entering the vehicle. The activation causes the power seat electric motors to adjust the seat to the stored position. In many vehicles, two or more seat and steering wheel positions can be stored. Thus, if two persons drive a particular vehicle, each may store a different seat position.

At the minimum, the power seat system with memory described above requires that the user open the vehicle's door. In some other cases the user must enter the vehicle and turn the ignition key on in order to operate the memory position switches.

U.S. Pat. No. 4,754,255 describes a user identifying vehicle control and security device which is said to respond to a particular user remote control signal to control, through the automobile memory system, the positions of the driver's seat and the steering wheel (column 12, lines 45-51). Thus, the system described requires that the vehicle already has a memory seat function in place.

It is therefore an object of the invention to provide a remote control vehicle memory seating positioning system for vehicles equipped with a power seating positioning system, but without a memory seat function.

Another object of the invention is to add memory positions to a vehicle already equipped with a limited number of memory seat positions.

A further object of the invention is to provide a system positioning and vehicle security system which, upon declaration of an alarm event by the security system, automatically sets the vehicle driver's seating position such that it is virtually impossible to drive the vehicle.

Yet another object of this invention is to provide a remote control vehicle seating position system wherein, upon actuation of the system remote control and receipt of the predetermined code, the vehicle driver's seating position is automatically positioned to an "easy access" position, thereby providing the maximum attainable legroom for the easiest entry into the vehicle, and which, upon actuation of the vehicle ignition switch, moves the seat to a memory seat position associated with the received remote control signal code.

SUMMARY OF THE INVENTION

In accordance with one aspect of the invention, a remote controlled seating positioning system is described which operates in conjunction with a vehicle power seating positioning system, having power seat positioning means but which does not include a memory seat position function. The system includes a user-activated remote control transmitter for transmitting one or more predetermined channel code signals, and means disposed within the vehicle and responsive to received channel code signals for generating receiver code signals indicative that a particular predetermined channel code signal has been received.

The system further includes a programmable electronic memory, and means for sensing the present position of the vehicle seat and providing sense signals indicative of the operation of the seat positioning means.

A user programming means is provided for programming the memory with a seat positioning data set defining a particular selected seating position corresponding to a particular channel code. A system controller is responsive to the receiver code signals and the sensing means to control the operation of the seating positioning means. Seat position control signals are generated in response to a particular receiver code signal to position the seat at the selected seating position corresponding to the particular channel code. Thus, the vehicle seating position may be set to a desired position by actuation of the remote transmitter. The system can also be used to add additional memory positions to a vehicle already equipped with a limited number of memory seat positions.

When a multichannel transmitter is employed wherein the user may selectively send one of a plurality of predetermined channel codes, different authorized users of the vehicle may program into the memory a particular seating position, and that seating position can be selected by using the remote transmitter to send a particular channel code corresponding to that seating position.

In accordance with another aspect of the invention, a remote controlled vehicle seat and steering wheel positioning system is described, that operates in conjunction with a car alarm. Whenever the alarm is activated, the steering wheel and seat are automatically moved to an alarm position where the seat and the backrest are moved as forward as possible, and the steering wheel is extended to its highest position, thereby virtually preventing the vehicle from being driven. The system includes a multi-channel remote transmitter, and a receiver unit mounted in the vehicle. A security system controller is responsive to the signals from the transmitter and received by the receiver to arm and disarm the security system, and to door trigger, ignition switch sensor and other security system triggers and sensors to generate an alarm signal when the system detects an unauthorized intrusion when the system is in the armed state.

The system further includes a controller for controlling the positioning of the vehicle seats and steering wheel via electric positioning motors. The positioning controller receives status data from the security system, and acts in response to a security system alarm condition to move the vehicle driver seat to the position closest to the steering wheel, tilt the seat back toward the dashboard and to extend the steering wheel to a position closest to the driver's seat. In this alarm position, it is virtually impossible for a person to sit in the driver's seat and steer the vehicle.

Other features of the system include remoteactivated positioning of the driver seat and steering wheel in response to remote transmitter signals, to place the seat and wheel at a predetermined position corresponding to a particular channel code. This permits the multichannel transmitter to cause the positioning of the seat before the user enters the vehicle. Another feature of the system is an "easy access" mode which causes the seat to move to the rearmost position upon disarming of the security system via the remote control. This allows the driver to have the maximum attainable legroom for the easiest entry into the driver's seat. Once the ignition switch is turned on, the seat is moved automatically to a predetermined position corresponding to a particular channel of the remote control.

The "alarm" and "easy access" features can be enabled or disabled by the driver. Furthermore, particular transmitter channels can be programmed by the driver to correspond to particular seat and steering wheel positions.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
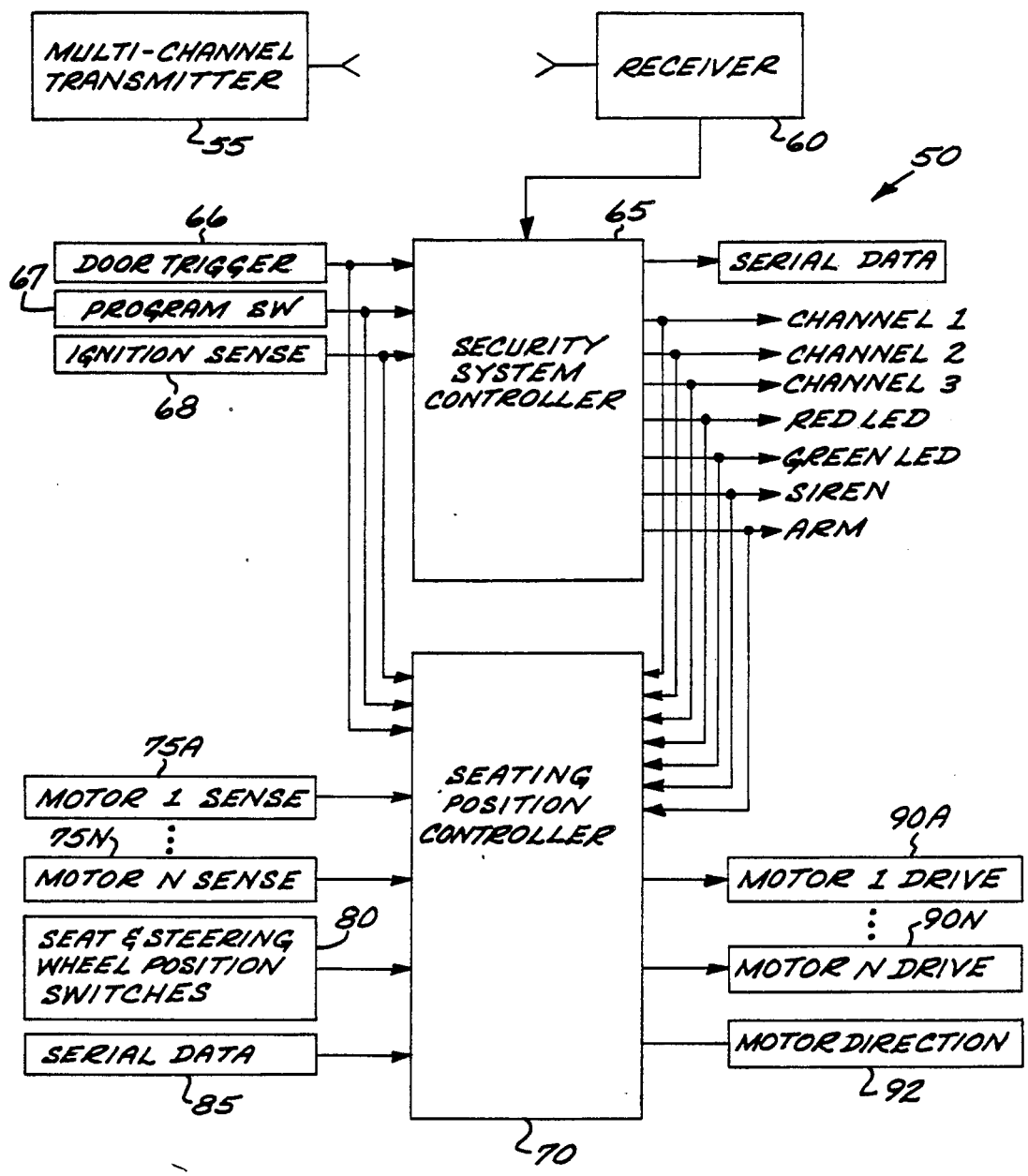
FIG. 1 is a simplified block diagram of a remote control and alarm activated seat and steering wheel positioning system in accordance with the invention.

Referring now to FIG. 1, a simplified block diagram is shown of a remote controllable and alarm-activated seat and steering wheel positioning and security system 50 embodying the invention. It is contemplated that the system 50 will be typically installed in a vehicle equipped with a conventional power seating positioning system, wherein the vehicle driver actuates switches to position the seat at a desired position. The vehicle may or may not also be equipped with a memory seat function; if already equipped with such a conventional system, the system 50 can provide additional features and additional memory seat positions.

The system 50 comprises a multi-channel remote transmitter 55 and a receiver unit 60. The transmitter 55 performs the functions of transmitting one of a selected plurality of available digitally encoded RF signals; an exemplary multi-channel transmitter suitable for this purpose is described in U.S. Pat. No. 4,890,108, assigned a common assignee with the present application, the entire contents of which are incorporated herein by this reference. It will be appreciated that, to practice several aspects of the invention, a single channel transmitter will suffice. The receiver unit 60 may be of the type described in U.S. Pat. No. 4,887,064, assigned to a common assignee with the present application, the entire contents of which are incorporated herein by this reference.

The system 50 further comprises a vehicle security system, which comprises a security system controller 65 which is responsive to security system trigger and sensor outputs, such as a vehicle door trigger 66, an ignition switch sensor 68, and the system program switch 67. The controller 65 is further responsive to receiver output signals from the receiver 60, which provides a digital signal indicative of the digital coding on received RF signals. The controller 65 compares the received code to stored digital codes to determine if one of the stored digital codes corresponds to the code of the received signal. If a match is made, the controller 65 is programmed to perform one or more functions initiated by receipt of the particular code. For example, a particular system may use four channels and a particular stored code may correspond to channel 1, for example, to arm or disarm the security system. These functions in a security system are known in the art, as described in U.S. Pat. Nos. 4,887,064 and 4,890,108. In the system described herein, the channel 1 code also activates the seat positioning to a certain predetermined position, as will be described below in further detail.

The system further comprises a seating position controller 70, which is responsive to signals received from the security system controller 65, the door trigger 66, program switch 67, and ignition switch sensor 68 of the security system. The controller 70 is further responsive to signals received from the vehicle seat and steering wheel positioning switches 80, and to sensing circuits 75A-N for the seat and steering wheel positioning motors. The controller 70 provides motor control signals for selectively activating the seat and steering wheel positioning motors to position the seat and steering wheel in accordance with the received signal commands and prestored position data.

This two controller arrangement 65 and 70 is particularly useful to provide a remote control seating positioning system which operates in conjunction with a vehicle security system, since this permits the seating positioning system to be marketed as a separate, optional system. Of course, this two controller arrangement is to be regarded as exemplary only; the functions of the separate controllers 65 and 70 could alternatively be combined into a single controller for certain applications.

Figure 8:
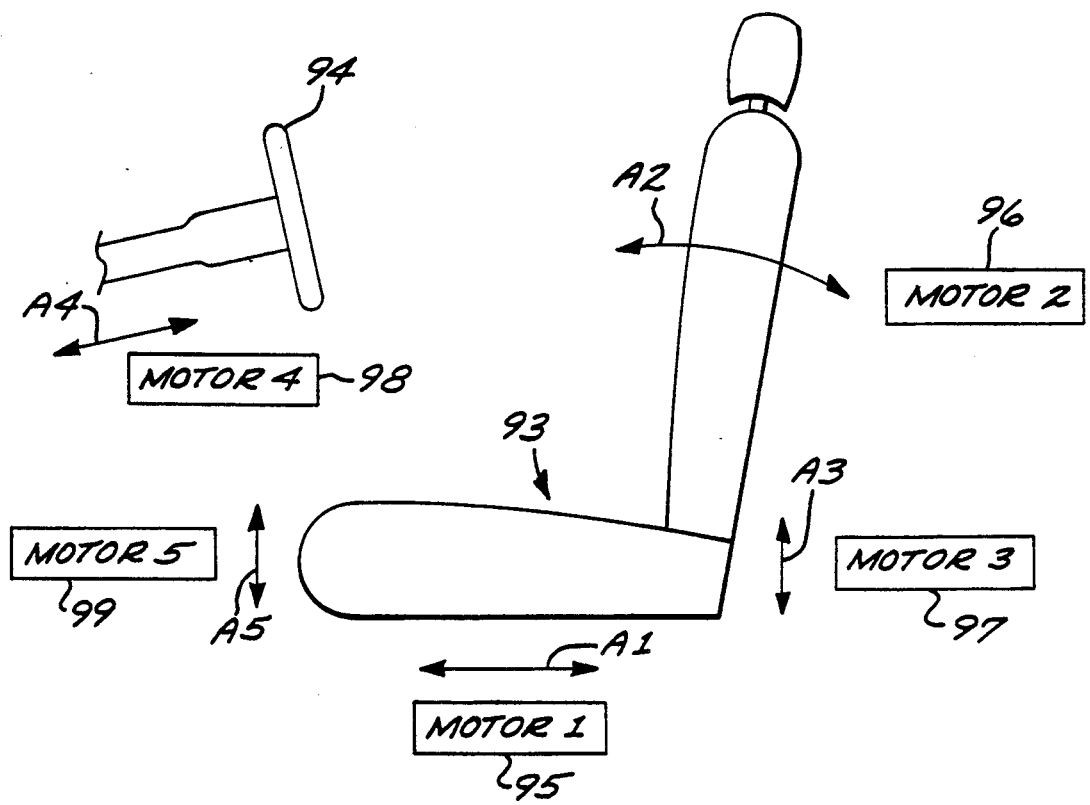
FIG. 8 is a diagrammatic view of a vehicle seat and steering wheel indicating typical ranges of positioning movement controllable in accordance with the system of FIG. 1.

FIG. 8 shows in a simplified diagrammatic fashion the possible ranges of movement controllable in an exemplary vehicle for positioning the driver's seat 93 and vehicle steering wheel 94. In this example, five different electric motors 95-99 are used for positioning the seat and steering wheel along the respective axes A1-A5. Of course, other vehicles may use fewer or more electric motors, depending on the number of positioning movements to be provided by the vehicle. Motor 95 moves the seat 93 toward or away from the steering wheel 94 along axis A1. Motor 96 rotates the seat back toward or away from the steering wheel in the direction of axis A2. Motor 97 adjusts the seat's rear height along axis A3. Motor 98 extends or retracts steering wheel 94 along axis A4. Motor 99 adjusts the seat's front height along axis A5. It will be appreciated that the motors 95-99 and associated drive coupling arrangements (not shown) for transferring the motor energy to the seat and steering wheel are well known.

Figure 2:
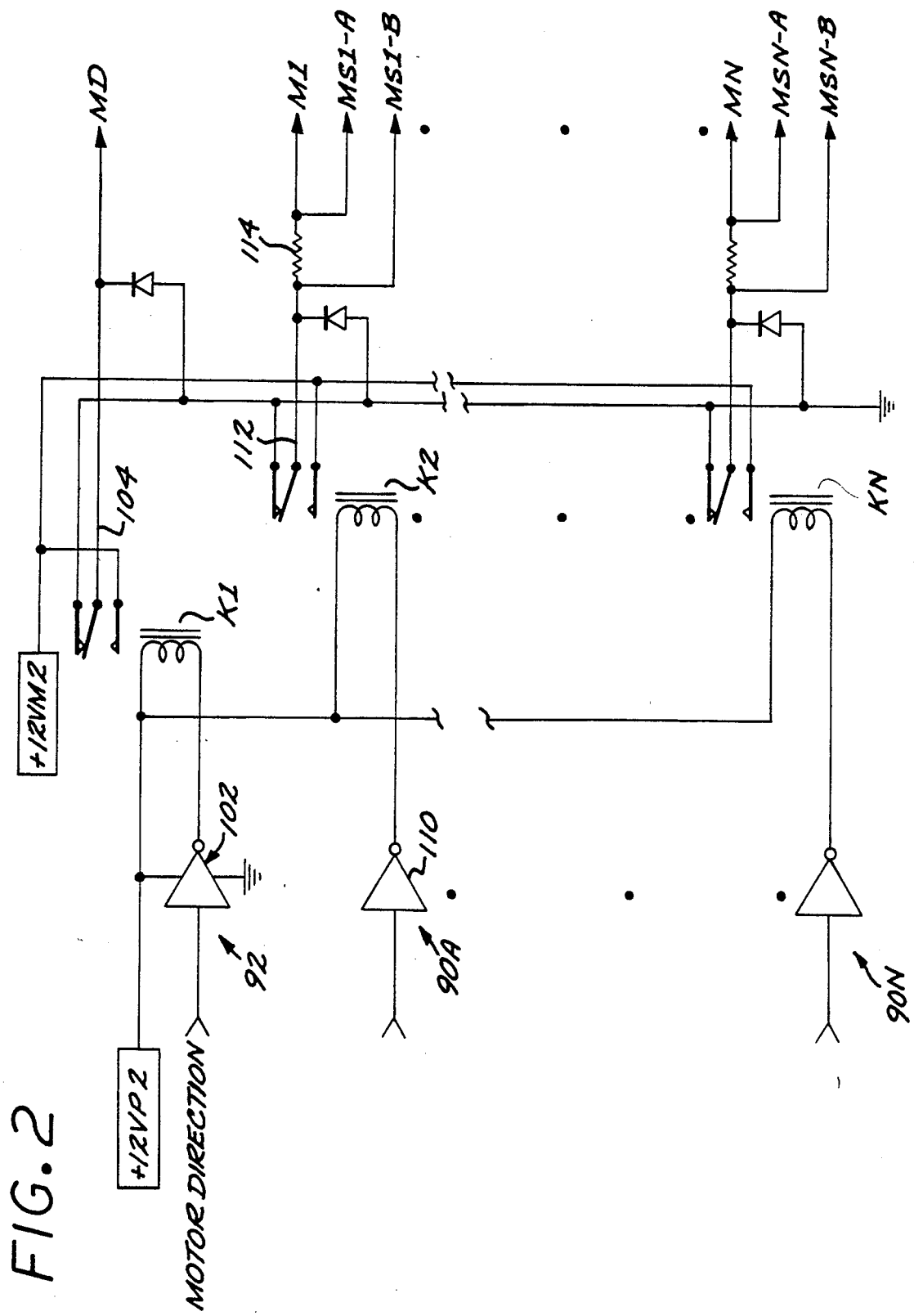
FIG. 2 is a schematic diagram illustrative of a motor drive circuit comprising the system of FIG. 1.

Exemplary motor drive circuits are shown in FIG. 2. The motor direction control circuit 92 selects the direction of motor movement for the selected motor and serves as the return line for the respective motor drive circuits 90A-90B. The circuit 92 comprises an amplifier 102 whose output controls a relay K1 which in turn controls the polarity of motor direction signal MD, i.e., the return line 104 is either at +12 volts or ground potential depending on the state of the relay K1.

The motor drive circuit 90A comprises an amplifier 110 which amplifies the controller signal to drive the relay K2 so that the relay output line 112 is either at ground potential or at +12 volts. The relay K2 output line is connected through a sense resistor 114, and the output node M1 drives the first motor 95. The resistor 114 comprises in this example a 0.1 Ohm resistor, and nodes MS1-A and MS1-B are connected to a corresponding motor drive sense circuit, shown in FIG. 3. The sense resistor 114 is employed to sense the current drawn by the motor 95, which in turn provides a means of monitoring the operation of the motor, from which may be determined the present position of the motor and the seat. Depending on the respective potentials of the motor return line 104 and the motor drive signal M1, the motor 95 will either be driven in one axial rotation direction or the other.

Each of the other motor drive circuits 90B-90N are identical to the motor drive circuit 90A, and are not described in further detail.

Figure 3:
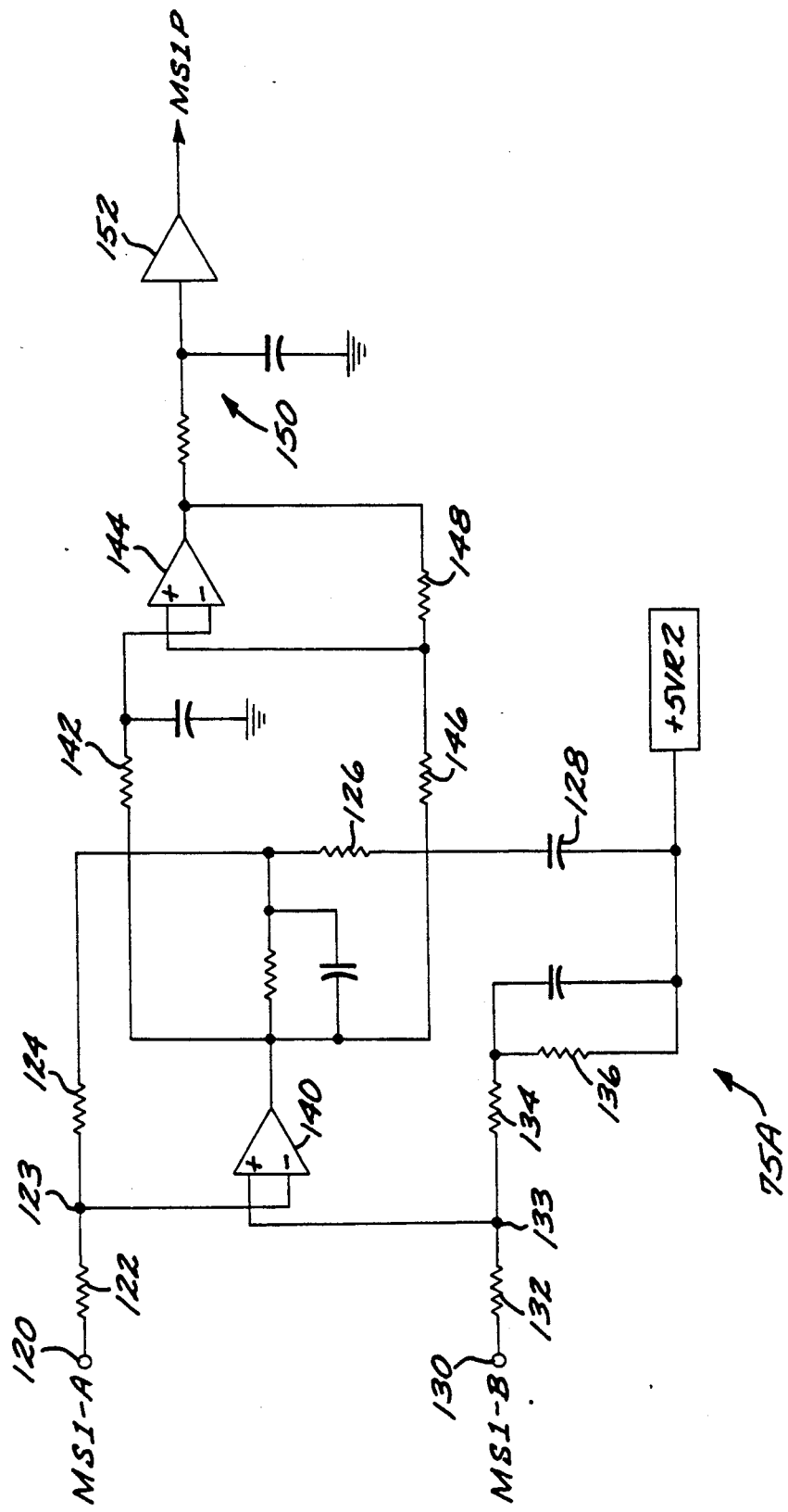
FIG. 3 is a schematic diagram illustrative of a motor sense circuit comprising the system of FIG. 1.

Referring now to FIG. 3, a schematic diagram of an exemplary motor sense circuit 75A is illustrated. The node MS1-A is coupled to node 120 which connects to a voltage divider network comprising resistors 122, 124 and 126 coupled through capacitor 128 to a +5 volt supply. Similarly, the node MS1-B is coupled to node 130 which connects to a voltage divider network comprising resistors 132, 134 and 136 coupled through capacitor 138 to the +5 volt supply. Node 133 for the MS1-A divider circuit is coupled to the inverting input of amplifier 140; node 133 for the MS1-B divider circuit is coupled to the non-inverting input of the amplifier 140. In this embodiment the amplifier 140 is a type LM324 amplifier device. The output of the amplifier 140 is coupled through resistor 142 to the inverting input of amplifier 144, and through resistor 146 to the non-inverting input of the amplifier 144. The amplifier 144 in this example comprises a type LM324 device, and the resistor 142 has a nominal value of 110 KOhms, while the resistor 146 has nominal value of 10 KOhms. The output of the amplifier 144 is fed back to the non-inverting input through resistor 148, and is coupled to the input of the buffer amplifier 152 through resistor 150. The function of the motor sense circuit 75A is to convert current sensing data from the sense resistor 114 into TLL pulses indicating contact with the motor brushes. Thus, the circuit 75A provides a pulse each time the motor shaft rotates through a predetermined angular excursion, determined by the number of brush contacts. The circuit 75A effectively filters the current sensing data signals to provide well defined pulses at the output of amplifier 144, which are then further filtered by the RC network 150 and amplified by amplifier 152 to provide a clean pulse signal MSIP.

Figure 4:
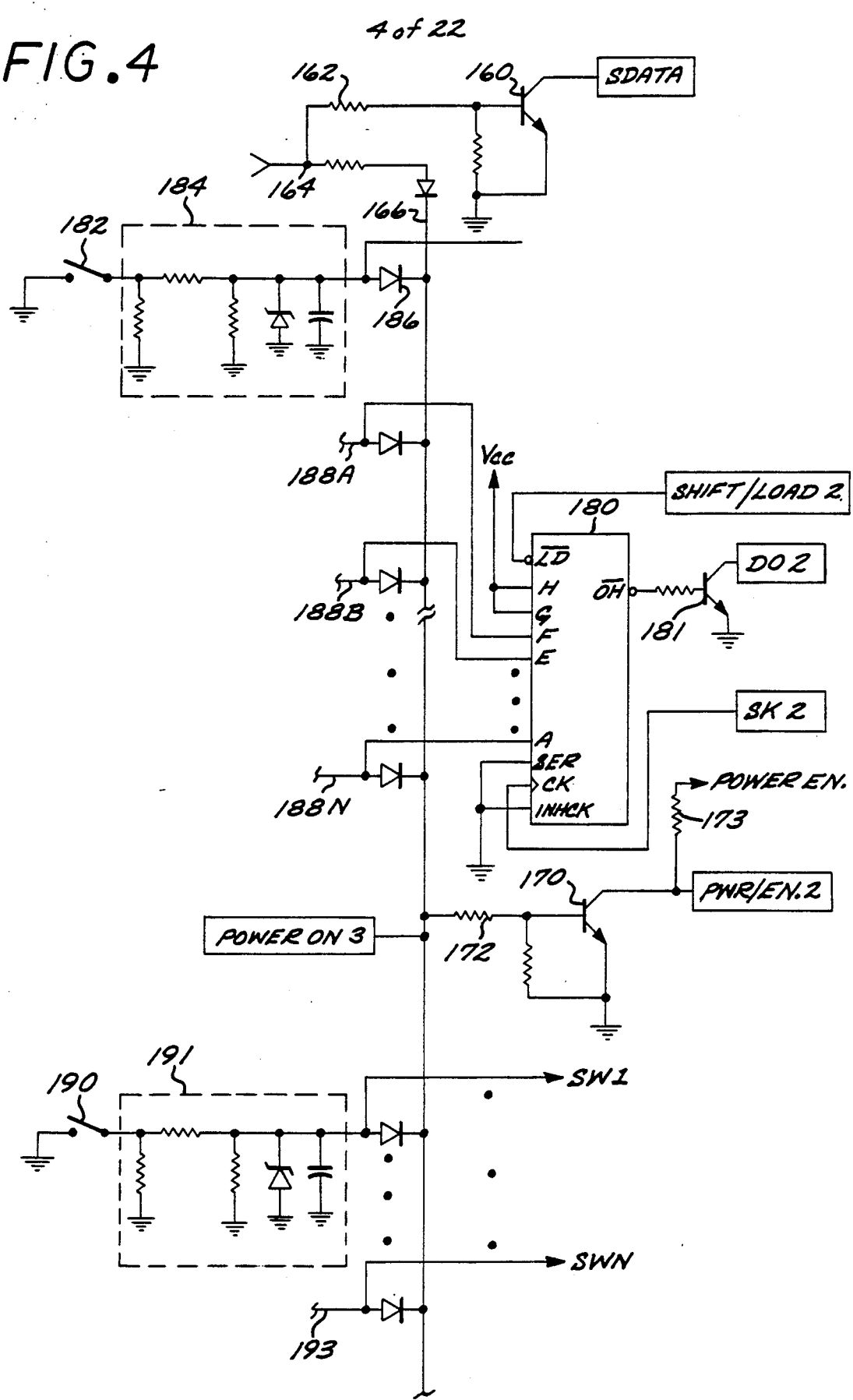
FIGS. 4, 6, 7a and 7b are schematic diagrams of circuitry useful for coupling data signals to the motor controller 70 of FIG. 1.

FIG. 4 shows circuitry for further signal conditioning of inputs to the seat controller 70. Serial data can be input to the seat controller 70 from the security system controller 65 via transistor 160 and resistor 162. This data can be in data packets, SERIAL DATA IN, each defining a particular motor address and destination, as motor movement instructions to be executed by the controller 70. This data drives the transistor 160 to provide the signal SDATA, which is input to the controller 70.

The controller 70 is not in a powered state until a seat position switch is actuated, or until a signal is received via the security system controller 65 requiring action by the controller 70. When node 164 goes active, line 166 is pulled up to provide an active POWER EN signal via transistor 170 and resistors 172 and 173. The POWER EN signal powers up the controller 65, as described more fully with respect to FIG. 7B.

Various ones of the seat and steering wheel position switches 80 are coupled to the controller 70 via serial shift register 180. For example, seat position switch 182 is connected to a conditioning circuit 184, the output of which is connected to an input port of the serial shift register 180. The output of the circuit 184 is also connected through diode 186 to line 166 in order to activate the PWR/EN signal when the switch 182 is activated, thereby causing power to be applied to the controller 70. Other manually actuated switches (not shown) are also coupled to the serial shift register 180 via lines 188A-N. The shift register 180 is operated by the load signal SHIFT/LOAD and clock signal SK generated by the controller 70. The data presented at the input terminals A-H of the shift register 180 are loaded into the register 180 when the signal SHIFT/LOAD is active, and then clocked out of the register by the clock signal SK through transistor 181 as a serial data bit stream DO. Use of the serial shift register 180 conserves the number of controller 70 input data pins utilized by the system.

Other seat/steering wheel positioning switches are connected to the controller 70 in this embodiment through conditioning circuits without passing through the shift register 180. Thus, switch 190 is coupled through conditioning circuit 191 to the controller 70 as signal SW1. The output of the conditioning circuit 191 also is connected to line 166 to activate the PWR/EN signal when the switch 190 is enabled. Another manual position switch and conditioning circuit (not shown) can be connected to line 193 to provide another switch signal SN to the controller 70.

Figure 5:
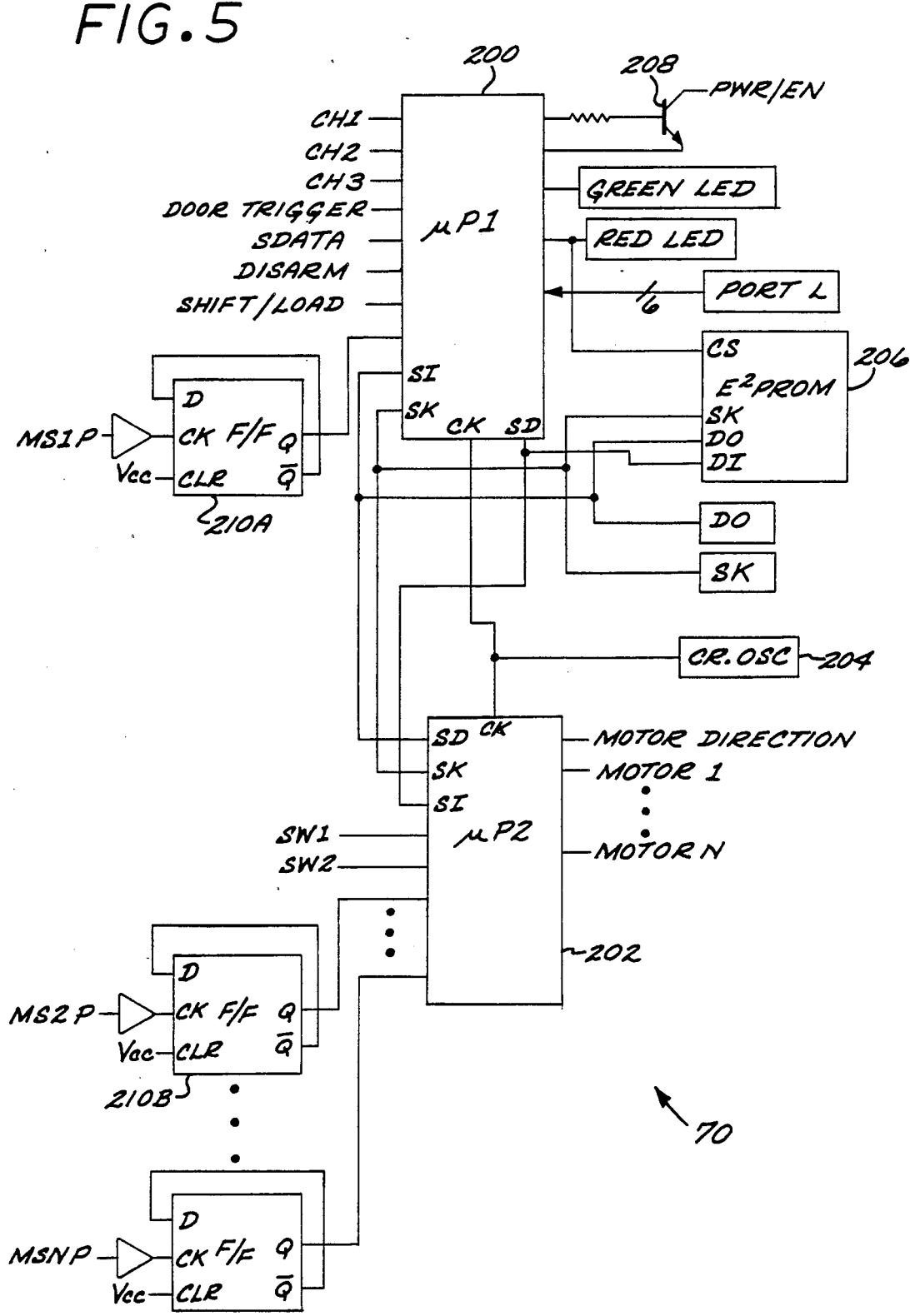
FIG. 5 is a simplified block diagram of the motor controller 70 of FIG. 1.

FIG. 5 illustrates the controller 70, which in this embodiment comprises two microprocessors 200 and 202. Of course, it will be recognized that this two microprocessor arrangement is to be regarded as exemplary only and not limiting the invention to controllers comprising two microprocessors; other arrangements can be devised which are suitable for the purpose and utilize, for example, only one microprocessor or even discrete logic only. In other implementations, the two controllers 65 and 70 may be implemented as a single microprocessor or microcomputer device. In this embodiment, the microprocessors 200 and 202 each can be implemented by a National Semiconductor Corporation type 888 microprocessor, for example. The two devices 200 and 202 are clocked by a single crystal oscillator 204, and function as a single digital computer.

The controller 70 further comprises an EEPROM device 206 which is connected to the microprocessors 200 and 202 as a peripheral non-volatile memory. The non-volatile memory 206 is used to store such data as the seat position data corresponding to a particular channel, i.e., for a particular driver, and the present seat position, as described more fully below. Both microprocessors 200 and 202 are connected to the memory device 206 so as to be able to read data from and to write data to the memory.

The motor sense circuit outputs MSIP-MSNP are connected to inputs of the microprocessors 200 and 202 through edge-triggered flip-flop circuits 210A-210N. The flip-flop circuits 210A-210N operate as frequency divide-by-two devices and provide a square wave output signal which is at one-half the frequency of the motor sense circuit output signal. The respective microprocessors 200 and 202 monitor the flip-flop output signals to keep track of the respective motor movement and accordingly the particular seat position.

The microprocessors 200 and 202 received data from the security system controller, including CH1-3, SDATA, and also receives the DISARM signal derived from the ARM signal generated by the security system controller. The microprocessors 200 and 202 also receive power seat switch data from the shift register 180 (FIG. 4) and from certain of the switches directly, as described above.

Figure 6:
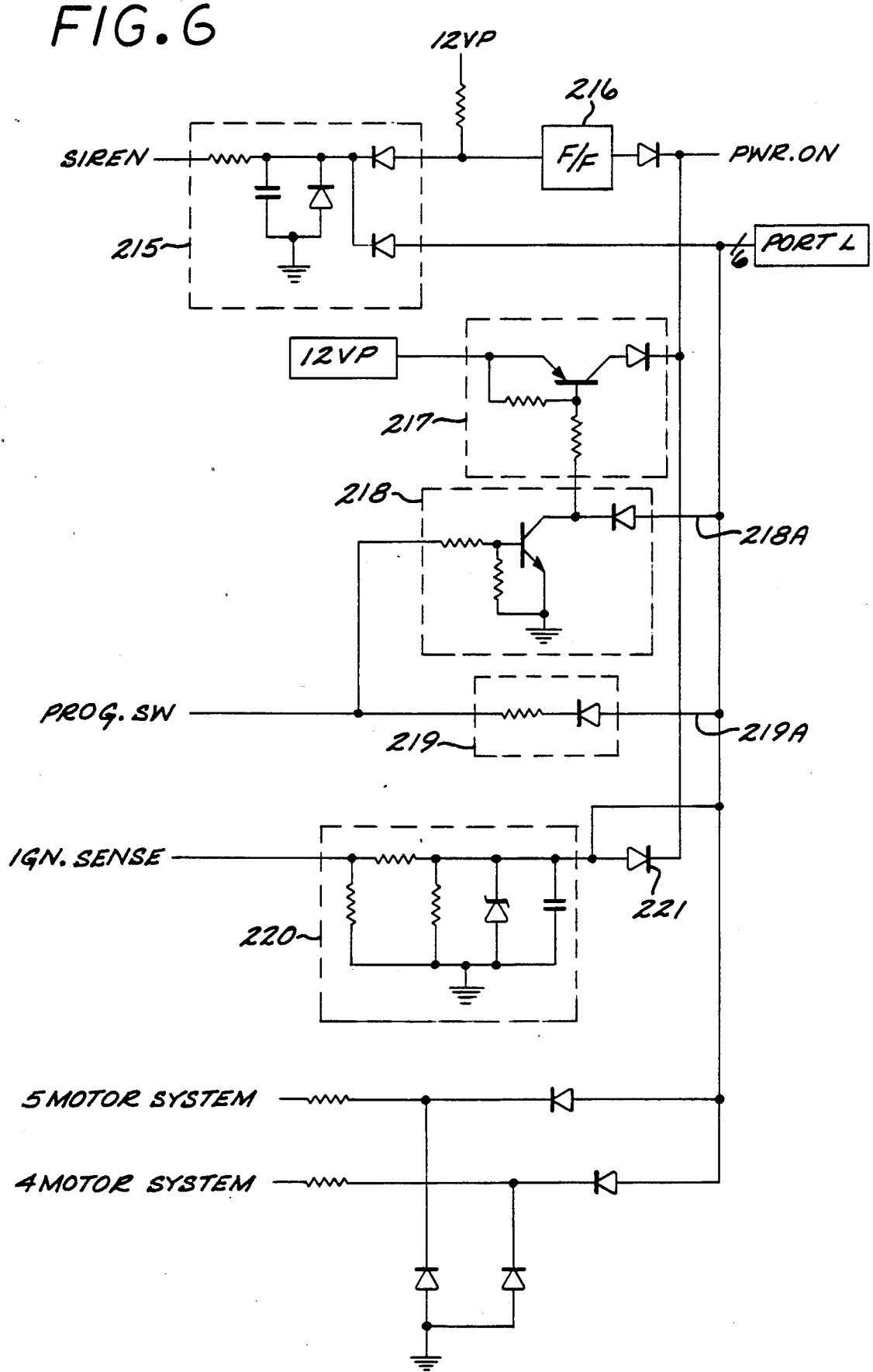

The microprocessor 200 also receives input data from the PORT L data bus, allowing data to be input to the microprocessor 200 indicative of the states of the security system output SIREN (active when the security system is in the alarm mode), the program switch state, the ignition sense circuit state, and the number of positioning motors to be controlled by the controller 70, i.e., indicating whether the particular vehicle in which the system 50 is to be installed has, for example, 3, 4, or 5 seat and steering wheel positioning motors. As shown in FIG. 6, these signals may be read from the PORT L bus. The signal SIREN is passed through conditioning circuit 215 to the PORT L bus, and to the input of flip-flop circuit 216 to provide a signal PWR ON, which also enables power to the controller 70 when the signal SIREN goes active. The program switch signal PROG SW is passed through a first conditioning circuit 218 to the port L bus, and through a second conditioning circuit 219 to the PORT L bus. The program switch employed for this embodiment is a three position switch with a momentary side (connected to +12 volts), a latched side (connected to ground), and an intermediate position (open). When the program switch is set to the momentary side, the signal PROG SW is at +12 volts, turning on the transistor comprising circuit 218, and pulling line 218A to ground. The signal on line 218A is interpreted as active low. When the program switch is set to the latched side, the line 219A is pulled to ground through circuit 219; the signal on line 219A is also interpreted as active low. Each state of the program switch may be read from the PORT L bus. The PROG SW signal is also connected through circuits 217 and 218 to provide a PWR ON signal to enable power to the controller 70. The signal IGN SENSE indicates the state of the vehicle ignition switch, and is coupled to the PORT L bus via circuit 220. The signal IGN SENSE is also connected through circuit 220 and diode 221 to provide a signal PWR ON. If the "5 MOTOR SYS" pin is grounded during installation of the system, this indicates to the controller 70 that the vehicle has five positioning motors. If the "4 MOTOR SYS" pin is grounded, the vehicle has four positioning motors. If neither pin is grounded, the vehicle has only three positioning motors.

Seat position motor control signals are generated by the microprocessor 202 to control the motor drive circuits 90A-90N and motor direction circuit 92 (FIGS. 1 and 2).

Figure 7A:
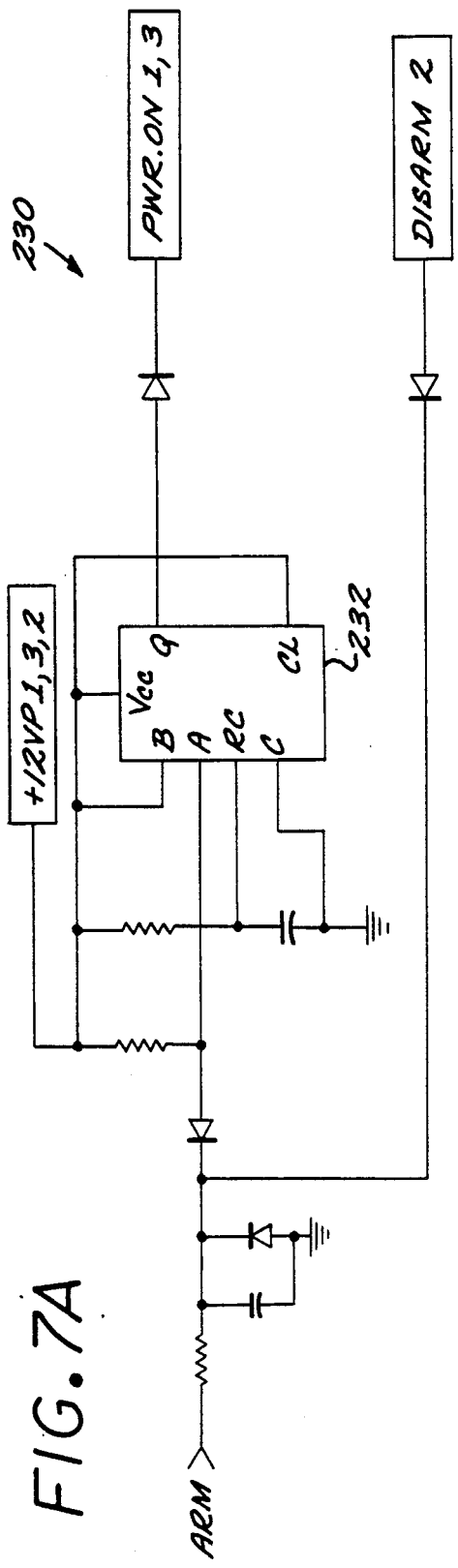

FIG. 7A illustrates the circuit 230 which generates the signals DISARM and PWR ON from the security system controller 65 signal ARM. The signal ARM has two states; in the active state, the security system is in the armed mode. The ARM signal is in its inactive state when the security system is the disarmed mode. The circuit 230 comprises a one-shot multivibrator 232 which is triggered by the edge of the ARM signal such that the PWR ON signal goes active for a predetermined time interval such as 0.5 second when triggered. The PWR ON signal activates power to the controller 70; once powered up, the controller 65 takes over and continues to apply power until certain conditions are met.

Figure 7B:
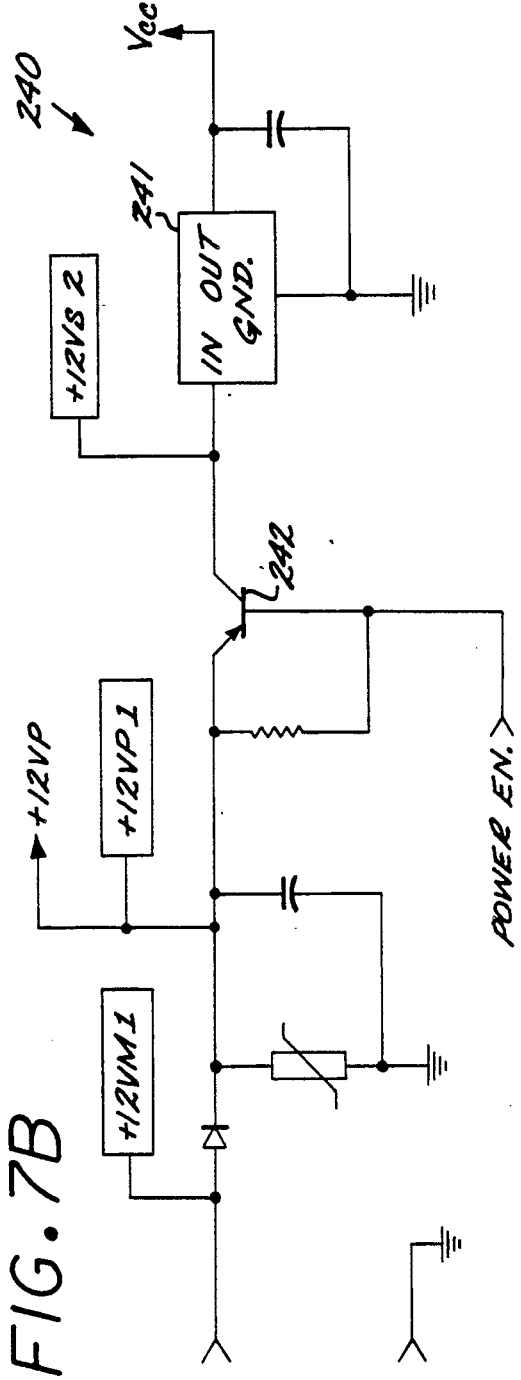

FIG. 7B shows a schematic of a power enabling circuit 240 which is activated by the signal POWER EN (FIG. 4). The transistor 242 is turned on by an active POWER EN signal. This causes a 12 volt supply voltage from the vehicle battery to be supplied to a five volt regulator device 244, in this embodiment a type 78L05A type device, in turn providing a regulated 5 volt supply VCC to power the controller 70. Once the controller 70 is powered up by an active POWER ON signal, microprocessor 200 activates outputs connected to the base and emitter of transistor 208 (FIG. 5) providing an active PWR/EN signal, which in turn maintains an active POWER EN signal (FIG. 4) to maintain VCC until the controller turns off the transistor 208.

The system 50 shown in FIGS. 1-8 has several important features and advantages. The driver of the vehicle can adjust the seats to his desired position before he gets to the vehicle by use of the remote transmitter. The system includes an emergency or alarm mode which virtually prevents an intruder from driving the vehicle since, when this mode is activated, the driver's seat will be moved to its closest position to the dashboard and the steering wheel will be extended the furthest possible amount. A further feature is an "easy entry" mode which, if enabled, moves the seat all the way back to allow for easy entry into the vehicle, in response to disarming of the vehicle security system by the remote transmitter. The motion of the seat backward will be completed before the driver has reached the vehicle.

The alarm mode automatically moves the seat and steering wheel to their closest proximity possible, when an alarm event is declared by the security system, to prevent an intruder from being able to occupy the driver's seat. In case of an attempted burglary, the seat will move to the alarm mode position as soon as the alarm is triggered but before any door is opened. Should the door be opened while the seats are in motion, the seat will continued with the alarm mode motion. The following exemplary seating positions, for a typical five motor power seat position system, will automatically be adjusted in the event of an alarm mode:
Seat's front height: full down
Seat's rear height: full up
Front/back motion: full forward
Seat back rest/tilt: full forward
Steering wheel: full extension upward If the security system is armed and the alarm is tripped, the alarm mode function will be activated, provided the door is still closed. Upon disarming the security system with the remote transmitter, the seat will move to the preselected memory position corresponding to the remote transmitter code, or in the event of the "easy access" mode, the seat will be moved all the way back.

Whenever the "easy entry" mode is enabled, the seat is automatically moved back when the system is disarmed by the remote transmitter, or when the ignition switch is turned "off," and is brought to its last position when the ignition switch is turned "on" after the system has been disarmed and the seat moved all the way back. Thus, if the security system was disarmed with the remote transmitter, first the seat is moved all the way back to allow easy entry. Once the ignition switch is turned "on" by the driver the seat will move to a memory position corresponding to the remote transmitter which disarmed the security system or to a received channel code signal. Conversely, when the ignition switch is turned "off," the seat will automatically be moved all the way back to allow for an easy exit. If the "easy access" mode is disabled, the seat positioning will be moved directly into the appropriate memory position immediately upon the disarming of the security system. Should a different position be desired by the driver, the driver must activate within thirty seconds of disarming the security system the channel on the remote transmitter corresponding to the new position. The seating memory position is determined by programming the transmitter's desired channel (button) at the selected memory position.

The system 50 is operable in a seating position program mode wherein the alarm and "easy access" modes may be enabled or disabled, and a desired remote control transmitter may be matched to a specifically selected memory position. The transmitter matching enables various drivers of the same vehicle to adjust the seating position to a desired position from a distance via the remote control before the driver gets to the vehicle.

Referring now to FIGS. 9-28, the flow diagrams shown therein illustrate the operation of the system depicted in FIGS. 1-8. At step 300 (FIG. 9), operation of the seat position controller 70 is initiated, either when the security system changes states between the armed and disarmed states, or when the vehicle power seat or steering wheel positioning switches are actuated. Either event causes power to be applied to the controller 70. At step 302, a "30 second on" timer is initiated, during which time the controller 70 maintains the powered up condition, even after the one shot device 232 has timed out, by turning on transistor 208 (FIG. 5).

Steps 304, 306, 308, 310, 312, 314, 316, 318 and 320 represent decisions which cause the controller 70 operation to branch to appropriate program operations in dependence on the decision outcome. Step 304 branches to node B (FIG. 10) if serial data input has been received from the security system controller. Step 306 branches to node C (FIG. 11) if an edge of the signal DISARM has been detected. Step 308 branches to node D (FIG. 12) if an edge is detected on the ignition sense signal. Step 310 branches to node L (FIG. 18) if an edge is detected on the SIREN signal. Step 312 causes steps 314 and 316 to be bypassed if the security system is not in the disarmed state. This prevents the seat and steering wheel from being moved in response to actuation of the position switches or a remote transmitter channel 2-4 signal, unless the security system is in the disarmed state. Step 314 branches to node E (FIG. 13) if a vehicle seat or steering wheel position switch has been actuated. Step 316 branches to node K (FIG. 17) if any of channels 2-4 are active, i.e., if a channel 2-4 coded signal has been received from the remote transmitter. At step 318, if the "30 second on" timer has expired, then at step 322 the power to the controller 70 is turned off by turning off the transistor 208. Step 320 returns to step 304 if the ignition switch is not on, or if the ignition switch is on, the "30 second on" timer is reset at step 324 and operation then returns to step 304.

Figure 9:
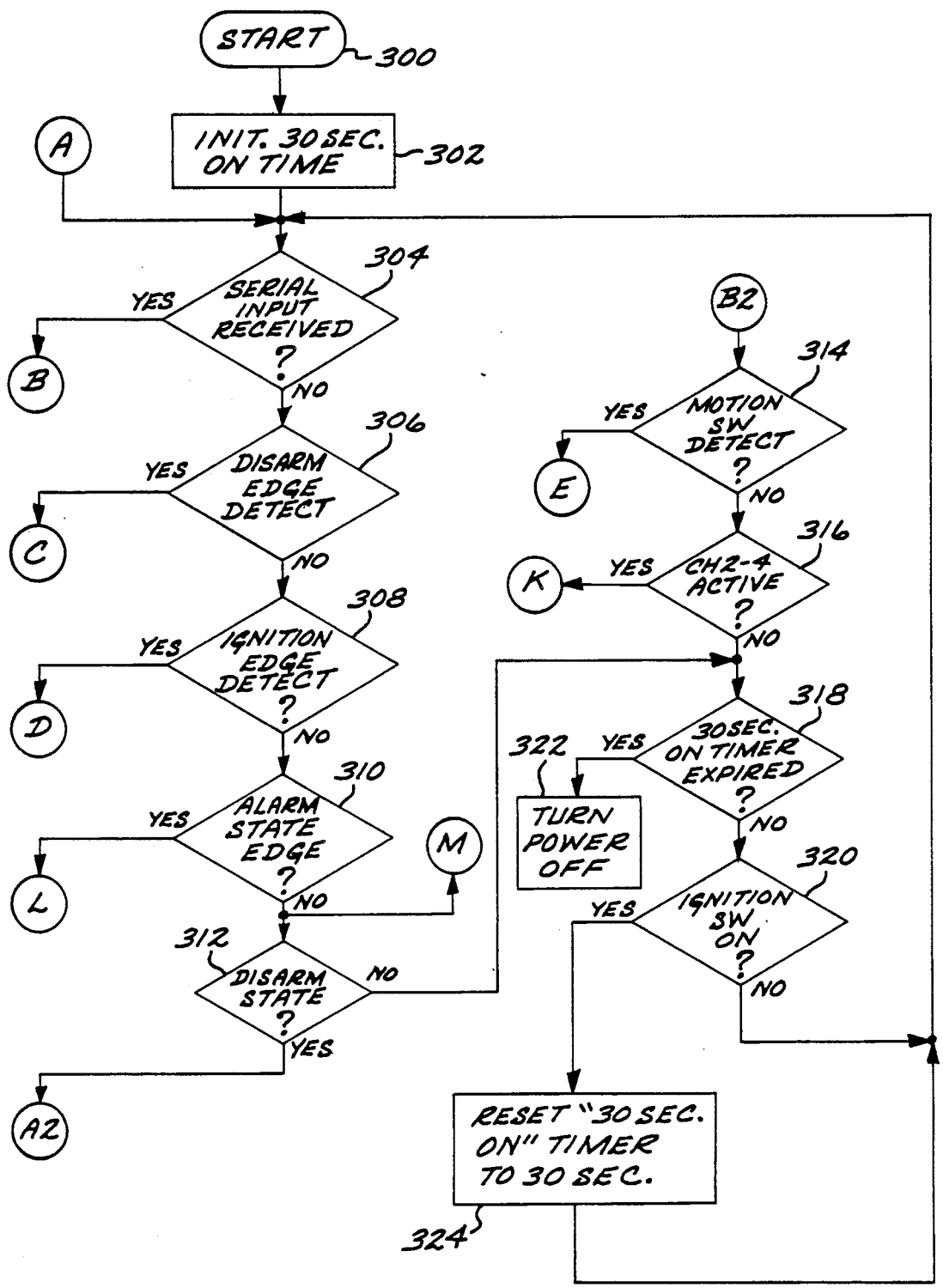
FIGS. 9-28 are flow diagrams illustrating the operation of the system of FIG. 1.
Figure 10:
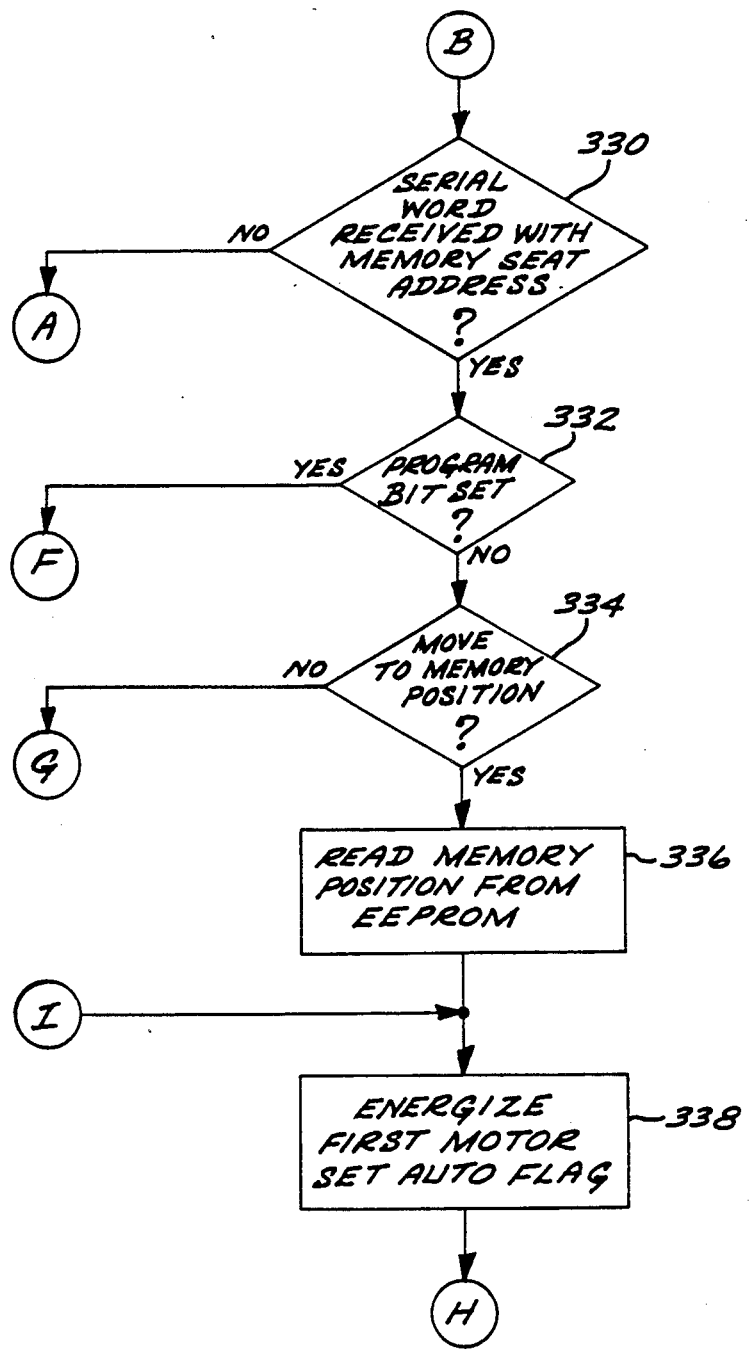
Figure 14:
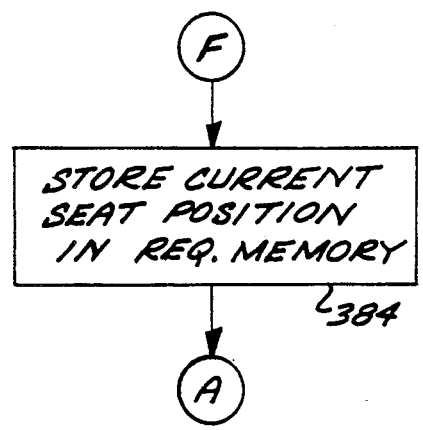
Figure 15:
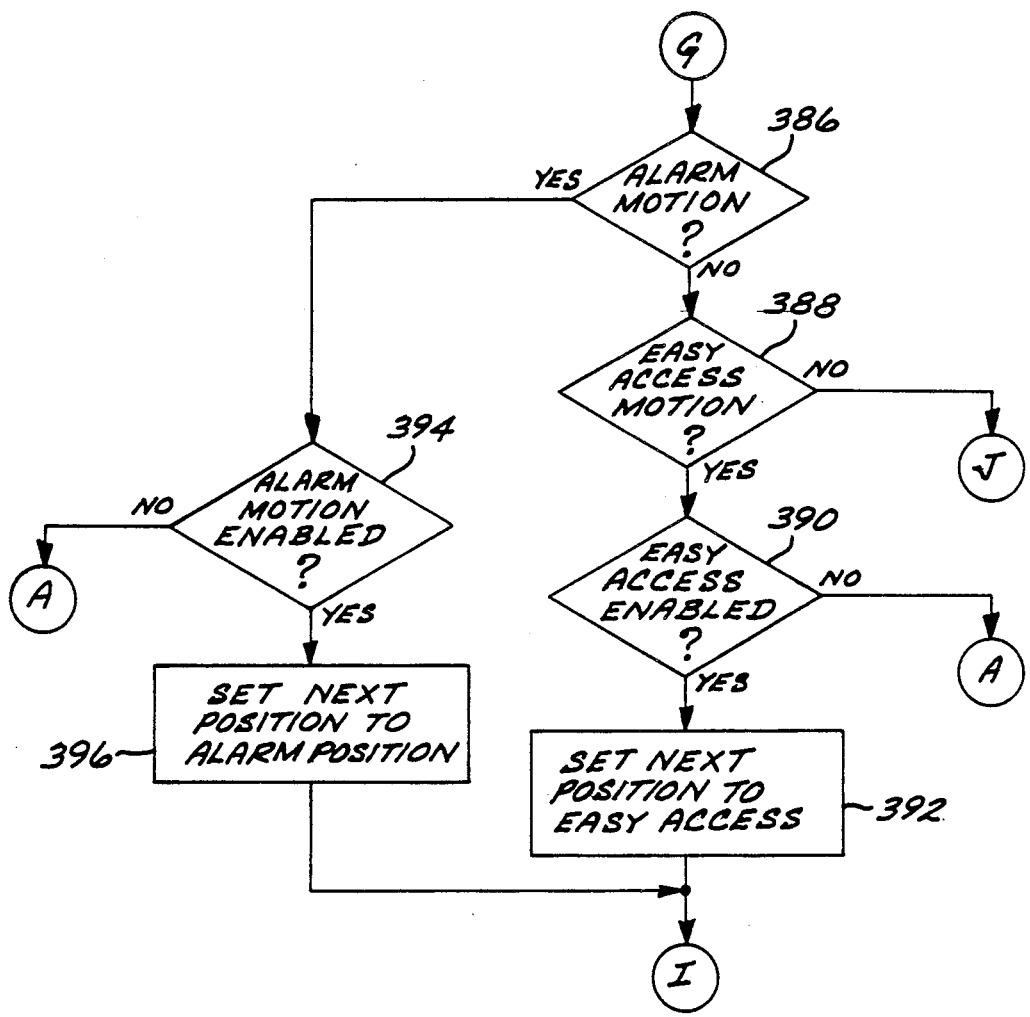

The controller 70 operation accessed at node B, i.e., if serial data has been received, is shown in FIG. 10. At step 330, if a serial data word has not been received from the controller 65 with a memory seat address, operation returns to node A (FIG. 9). If such a data word has been received, then the status of the program bit in the serial data word is checked, and if set, indicating that the current position of the motors is to be stored in memory to correspond to a particular channel, operation branches to node F (FIG. 14). Otherwise, operation proceeds to step 334, where the data word is analyzed to determine if it is a command to actuate a motor move to a memory position. If not, operation branches to node G (FIG. 15). If yes, then the memory position is read from the EEPROM (step 336) and the first motor is energized and the AUTO flag is set. Operation then proceeds to node H (FIG. 19) to move the motors to position the seat and steering wheel in the position corresponding to the stored position data.

Figure 11:
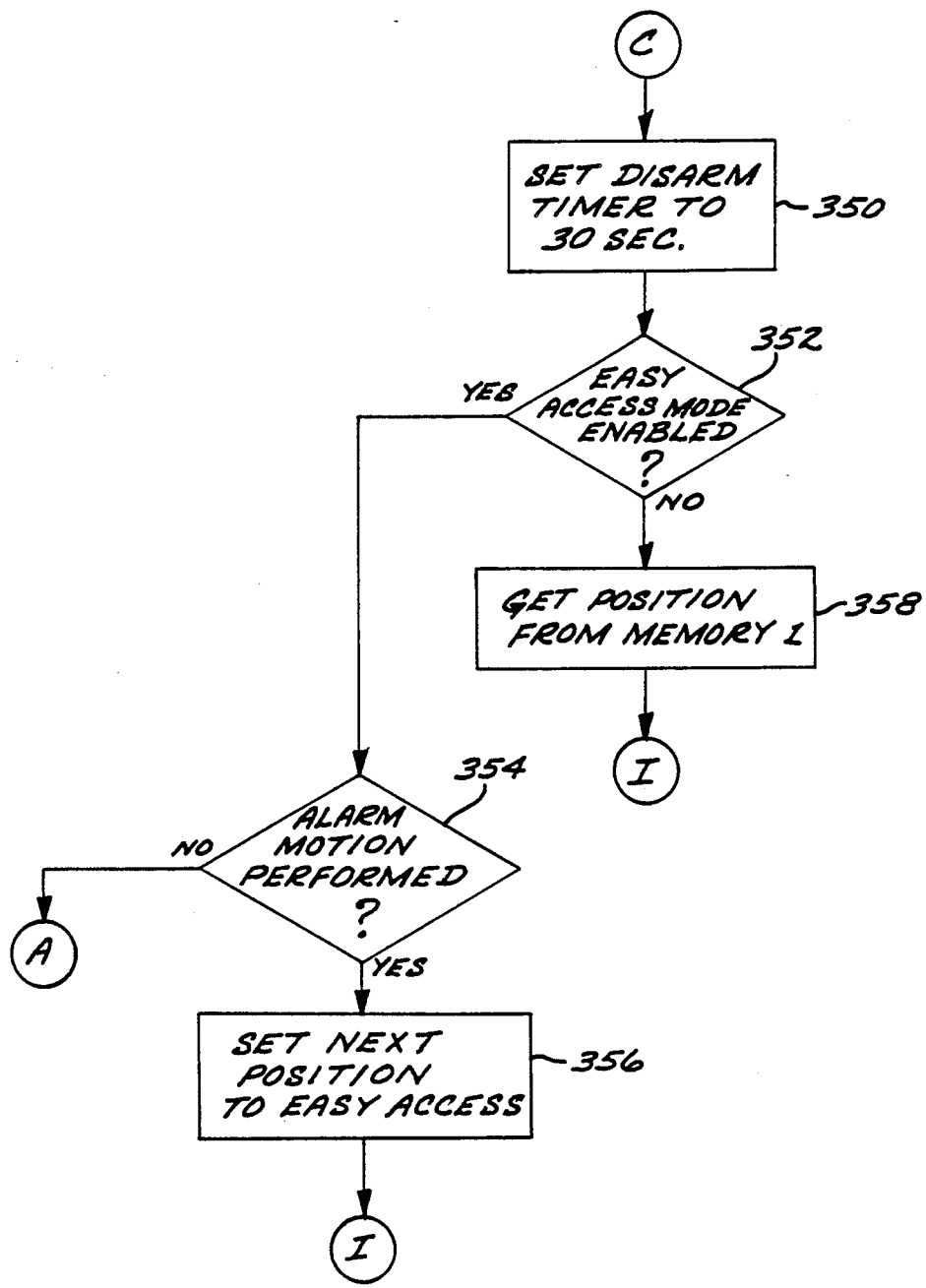

The program operation accessed at node C, i.e., if an edge on the DISARM signal has been detected, is shown in FIG. 11. At step 350, the "disarm" timer is set to 30 seconds. At step 352, if the "easy access" mode has been enabled, then at step 354, a decision is made to determine whether the alarm mode motion of the seats has been performed, and it not, operation branches to node A (FIG. 9). If the motion has been performed, then at step 356, the next seat position is set to the easy access position, and operation branches to node I (FIG. 10, step 338). If the "easy access" mode has not been enabled, then the channel motor positions are read from the memory 206 (step 358), and operation branches to node I (FIG. 10).

Figure 12:
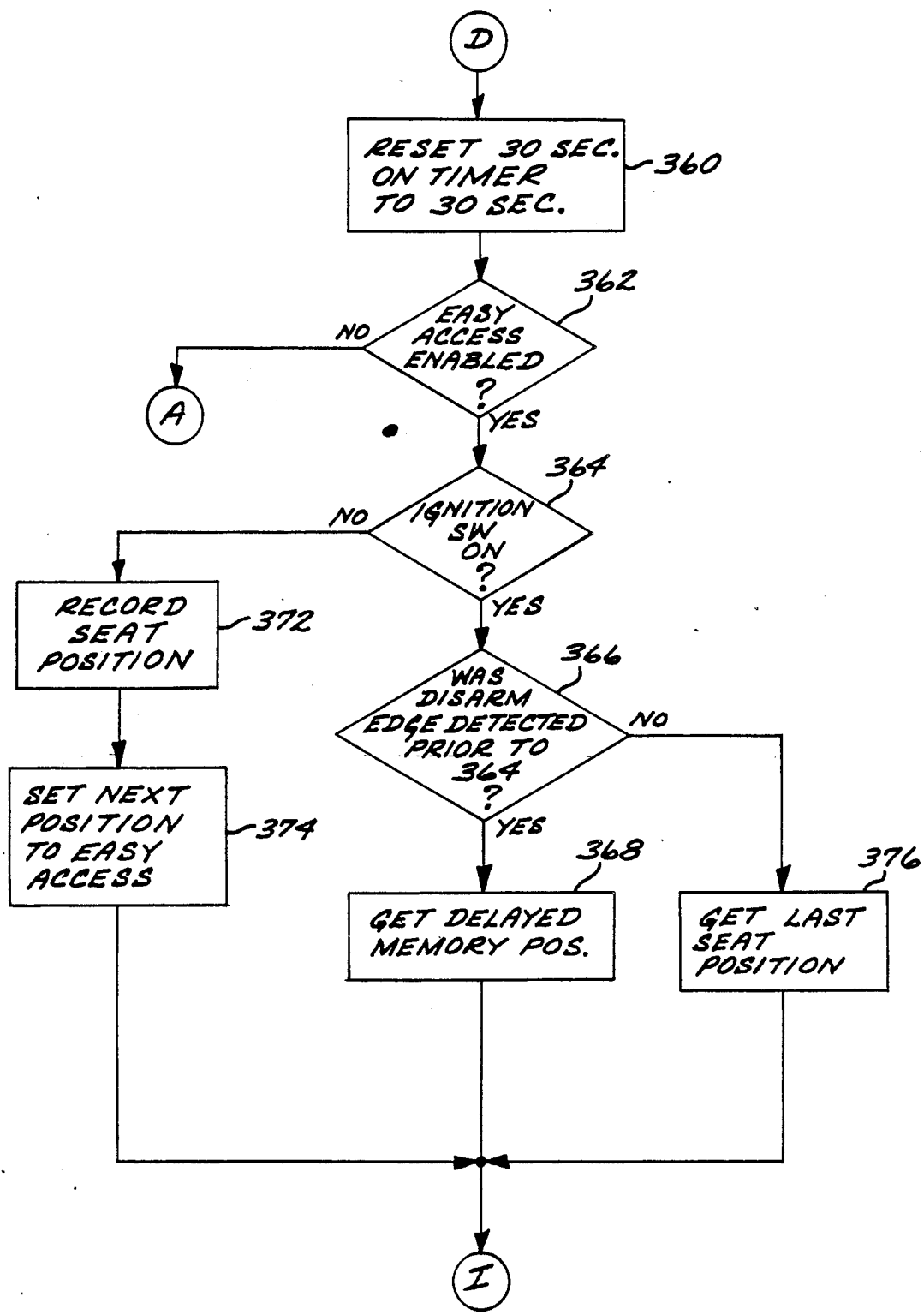

The operation accessed at node D, i.e., if an edge has been detected on the ignition sense signal, is illustrated in FIG. 12. At step 360 the "30 second on" timer is reset to 30 seconds. At step 362, if the "easy access" mode has not been enabled, operation returns to node A. Otherwise, at step 364 the ignition switch is checked, and if not in the on state, at step 372 the present motor positions are recorded (step 372), and at step 374 the next position is set to the "easy access" position with operation then branching to node I. If the ignition switch is on, then if the DISARM signal edge had been detected prior to step 364 (step 336), at step 368 the delayed memory position (corresponding to the particular received channel number) is retrieved and operation branches to node I. If the edge of the DISARM signal is not detected, then the last seat position is retrieved at step 376 and operation returns to node I. Thus, if the ignition switch had been turned off and then turned back on without the security system having been disarmed between these two steps, the seat will be moved from the easy access position back to the last seat position, and not to a delayed memory position.

Figure 13:
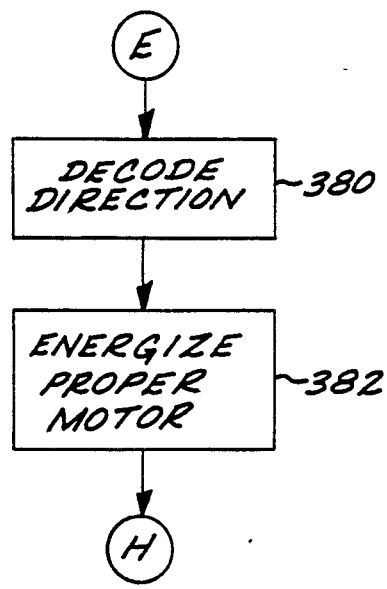

The operation accessed at node E, i.e., if one of the seat or steering wheel positioning switches has been active, is shown in FIG. 13. At step 380 the direction in which the particular motor is to be moved is decoded, and at step 382 the proper motor corresponding to the actuated switch is energized. Operation then branches to node H.

The operation accessed at node F, i.e., if the program bit is set in the serial data word (step 332), is shown in FIG. 14. Here, at step 384, the current seat position is stored in the nonvolatile memory and operation returns to node A.

Figure 16:
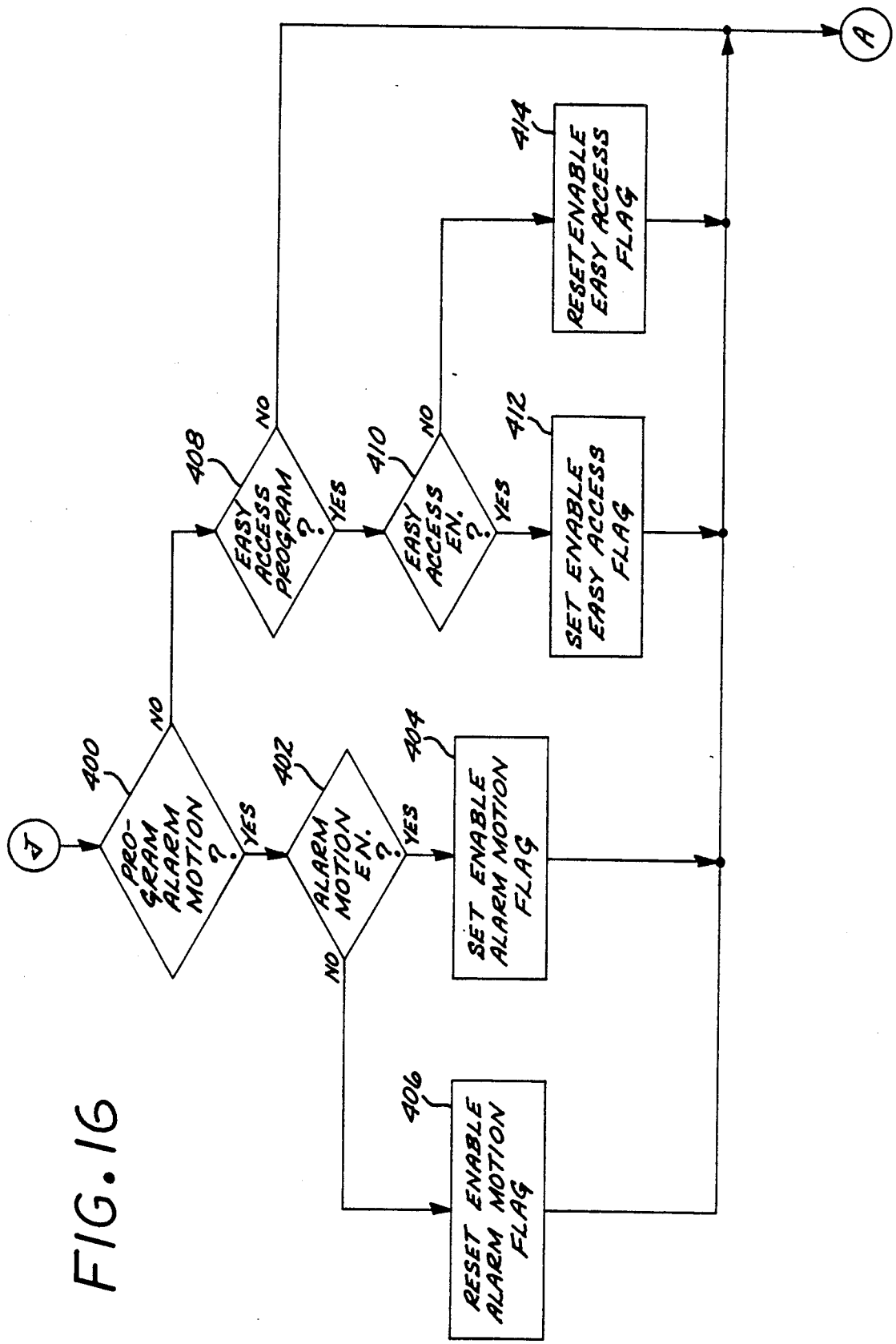

The operation accessed at node G, i.e., if the serial data word is not a command to move the seat to a memory position at step 334 (FIG. 10), is shown in FIG. 15. At step 394 a decision is made as to whether the serial data word is a command for the alarm mode motion to be executed. If yes, then at step 394, if the alarm motion mode feature has not been enabled, the alarm motion is not permitted, and operation returns to node A. If the feature has been enabled, then at step 396 the next position is set to the alarm position and operation then branches to step I. At step 388 a decision is made as to whether the serial data word is a command for the easy access motion to be executed. If not, operation branches to node J (FIG. 16). If yes, then at step 390 a decision determines whether the easy access mode has been enabled. If not, the easy access move is not permitted, and operation returns to node A. If the easy access mode has been enabled, the at step 392 the next position is set to the easy access position and operation branches to node I.

The operation accessed at node J (from step 388, FIG. 15) is shown in FIG. 16. At step 400, if the data word is a command to program the alarm motion feature, then at step 402 a decision occurs as to whether the alarm mode has been enabled. If not, the ENABLE ALARM MOTION flag is reset (step 406) and operation returns to node A. At step 408, if the serial data word is a command for the "easy access" program mode, the ENABLE EASY ACCESS flag will either be set (step 412) or reset (step 414) depending on whether this mode has been enabled. Operation then returns to node A.

Figure 17:
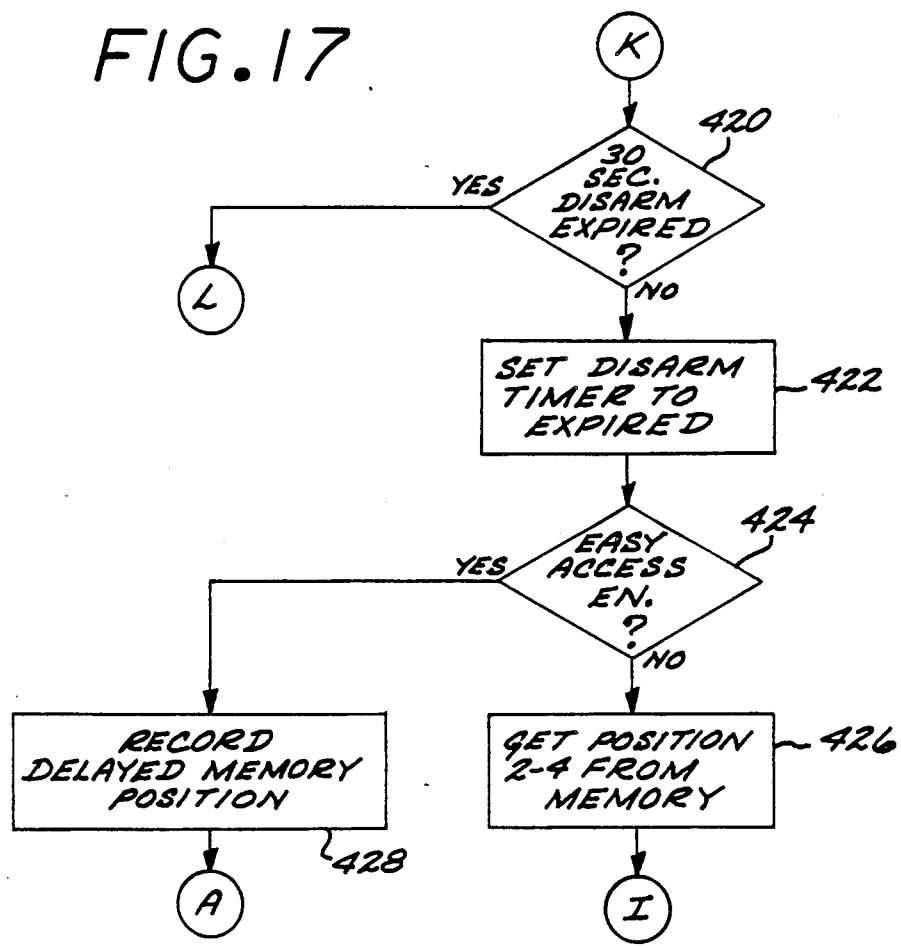

The operation accessed at node K (step 316, FIG. 9), i.e., if one of the channels 2-4 are active, is shown in FIG. 17. Here, at step 420 if the "30 second disarm" timer has expired, operation branches to node L. If the timer has not expired, then the disarm timer is set to the expired state (step 422). At step 424, if the "easy access" feature has been enabled, the memory position (corresponding to the respective channel 2-4) to be recalled after carrying out the easy access move is recorded (step 428) and operation returns to node A. If the "easy access" feature has not been enabled, then at step 426 the particular seat position data corresponding to the active one of the channels 2-4 is recalled from the EEPROM. Operation then branches to node I (FIG. 10).

Figure 18:
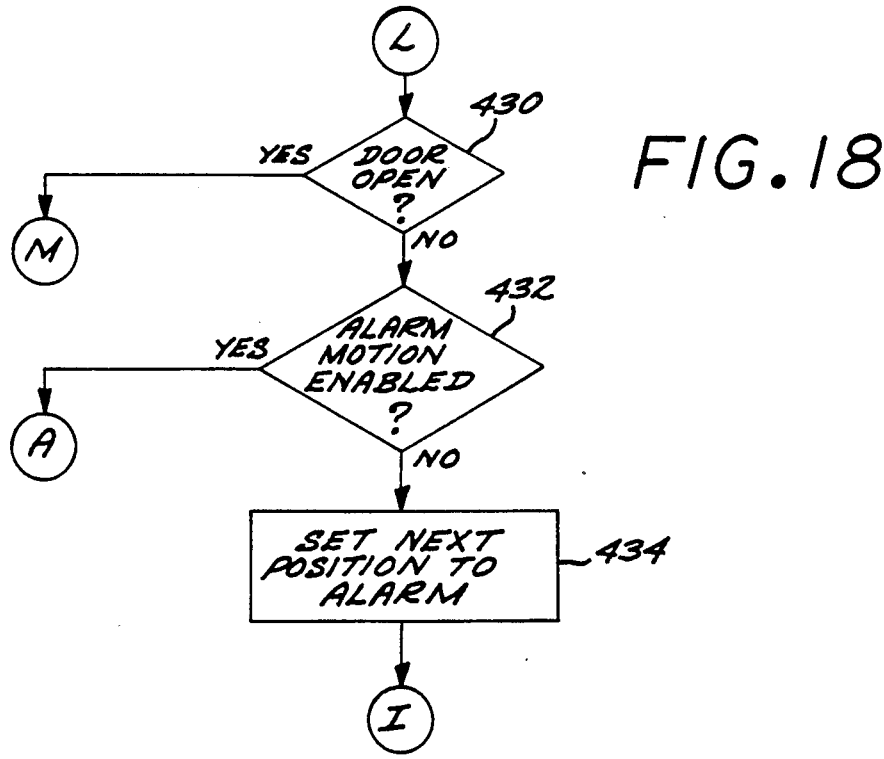

The operation accessed at node L, i.e., if an alarm state edge is detected at step 310, is shown in FIG. 18. At step 430 the door trigger state is checked to determine if the door is open. If the door is open, operation branches to node M (FIG. 9). If the door is not open, then at step 432 he ALARM MOTION flag is checked and if set the next position for the seat to be moved is set to the alarm position. If the flag is not set, then operation returns to node A.

Figure 19:
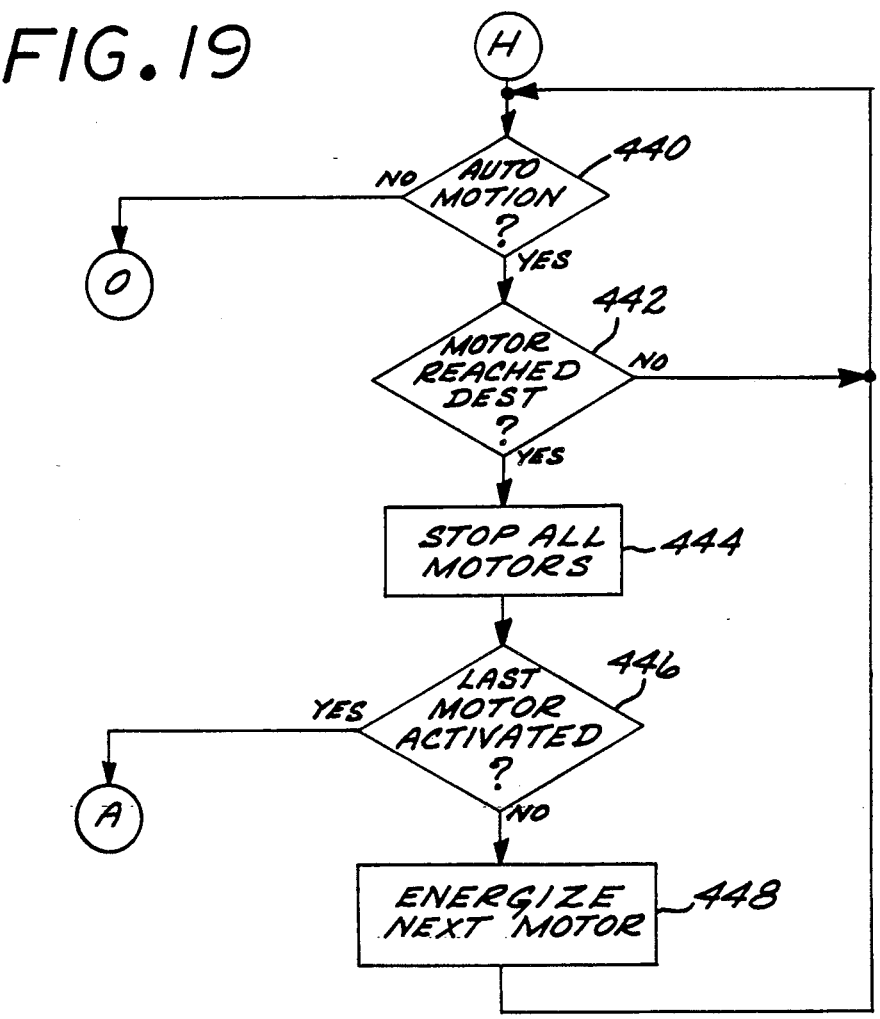
Figure 20:
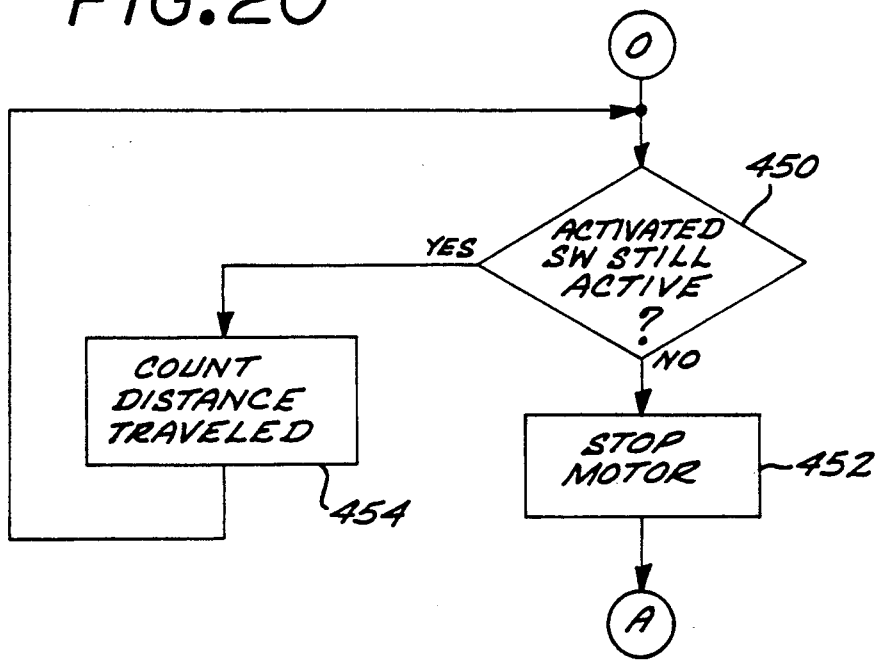

The operation accessed at node H, from FIG. 10, is shown in FIG. 19. At step 440 the AUTO MOTION flag is checked, and if not set, operation branches to node 0 (FIG. 20). If the flag is set, then at step 442, if the motor being moved has not reached its destination, operation loops back to step 440. If the motor has reached its destination, then all motors are stopped (step 444), and at step 446 if is determined that the last motor to be activated in the movement sequence has been moved, operation returns to node A. Otherwise, the next motor is energized (step 448) and operation loops back to step 440 to repeat the sequence for the next motor.

The operation accessed at node 0, FIG. 19, is shown in FIG. 20. The steps in FIG. 20 are accessed if the vehicle seat position switches are activated. Thus, at step 450 if the activated switch is still active, at step 454 the distance travelled by the activated motor is counted, and operation loops back to step 450. If the switch is not longer active, the corresponding motor is stopped (step 442) and operation returns to node A.

Programming the system in this embodiment is done via the program switch, a three position switch located within the vehicle at a convenient location. The program switch is a three position switch with a momentary side and a latched side. Exemplary techniques for programming these features are described below.

To enable the alarm mode feature, the program switch is held to the momentary side until the red LED is turned on. The program switch is then pressed to the momentary side and released twice. The system red LED will be blinked three times indicating the alarm motion program mode has been selected. The alarm mode feature is enabled by pressing the momentary side of the program switch. The alarm mode feature is disabled by pressing the latched side and returning the switch to the center position. The red LED will stop flashing once the programming is complete. The programming mode will be automatically terminated if no action is taken for ten seconds.

To program the "easy access" feature, the program switch is held to the momentary side until the red LED is turned on. Then the switch is pressed again to the momentary side and released. The red LED will blink twice indicating the "easy access" program mode has been selected. The feature is enabled by pressing the momentary side of the program switch. The feature is disabled by pressing the switch to the latched side and returning the switch to the center position. The red LED stops flashing once the program is complete.

To program a desired remote transmitter into a specific memory position, the program switch is pressed to the momentary side and held until the red LED turns on. The program switch is then flipped to the latched position, and then to the center position. The red LED will turn off, and the green LED blinks once per second, indicating that memory position one is now ready to be programmed. Other memory positions may be selected by pressing the momentary side of the switch. Each press and release of the switch increments the memory position. The green LED blink count indicates the seat memory position number to be programmed. The desired seat position is programmed by pressing the transmitter's channel button that has been selected to control this memory position, thereby transmitting the particular code corresponding to this channel. The receiver unit receives the signal and it is decoded so that the particular channel output of the controller 65 goes active. The current seating position is stored in memory position one of the memory 206. The green LED stops flashing once the program is complete.

Figure 21:
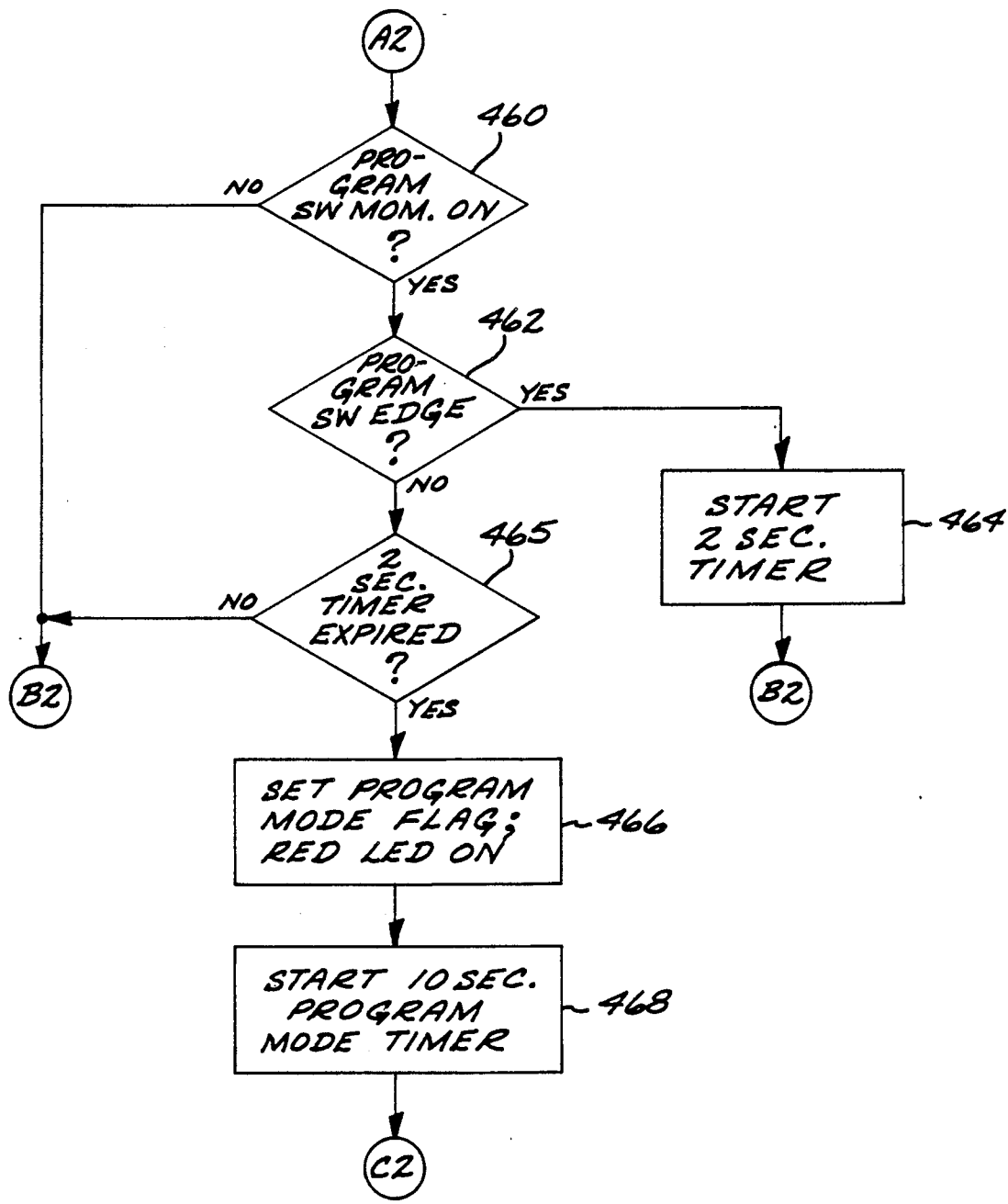

FIG. 21 shows the system operation accessed at node A2 (from FIG. 9, step 312), wherein the system may be programmed via the program switch. At step 460 the status of the program switch is checked, and if not held to the momentary side, operation branches to node B2. If the program switch is held to the momentary side, then at step 462, if an edge is detected on the program switch momentary side signal, a two second timer state is started (step 464), and operation branches to node B2. At step 465, a two second timer state is checked, and if it has not expired, operation branches to node B2. If the timer has expired, then at step 466, the PROGRAM MODE flag is set, and the red LED is turned on. A ten second program mode timer is started at step 468, and operation branches to node C2.

Figure 22:
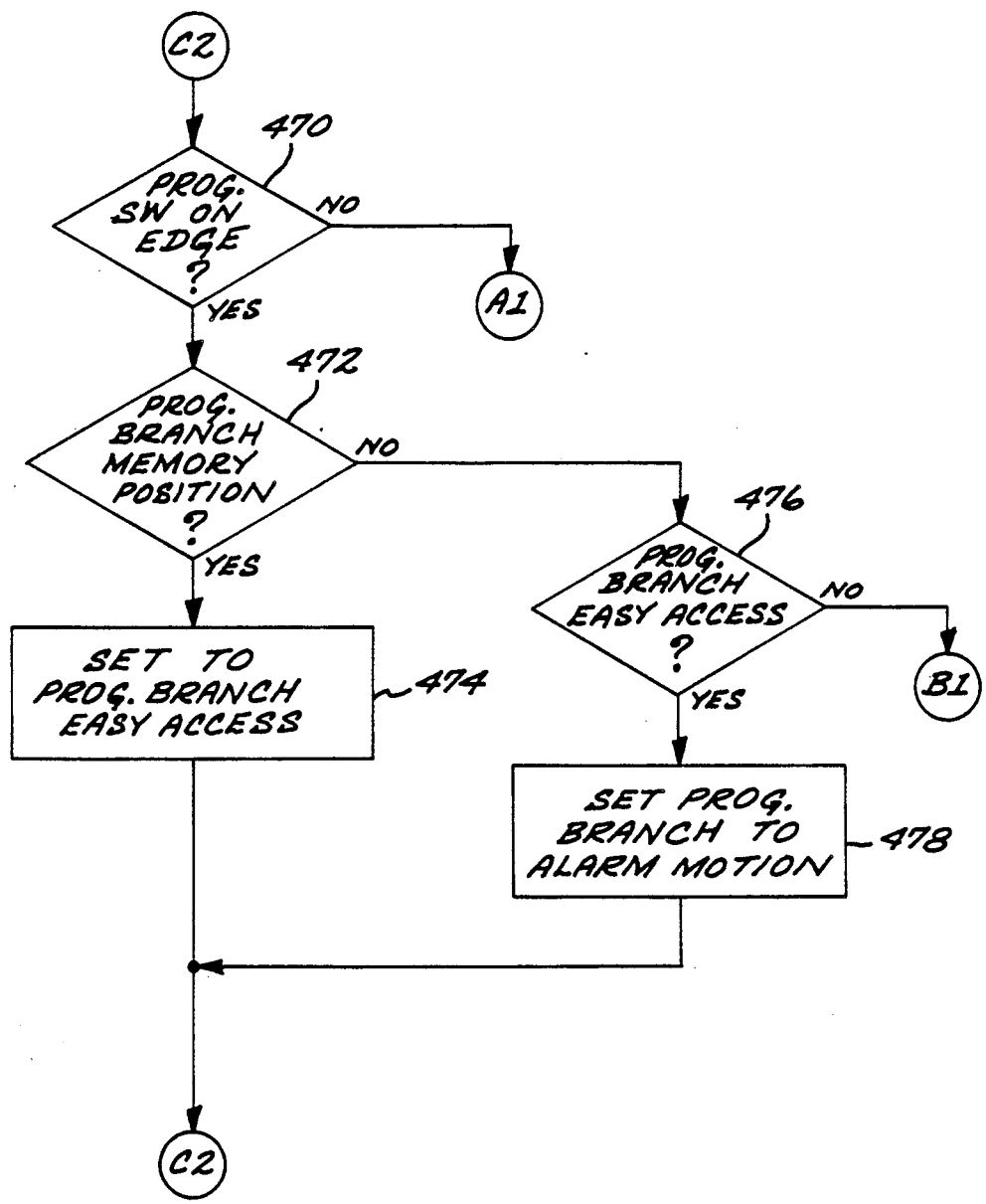
Figure 25:
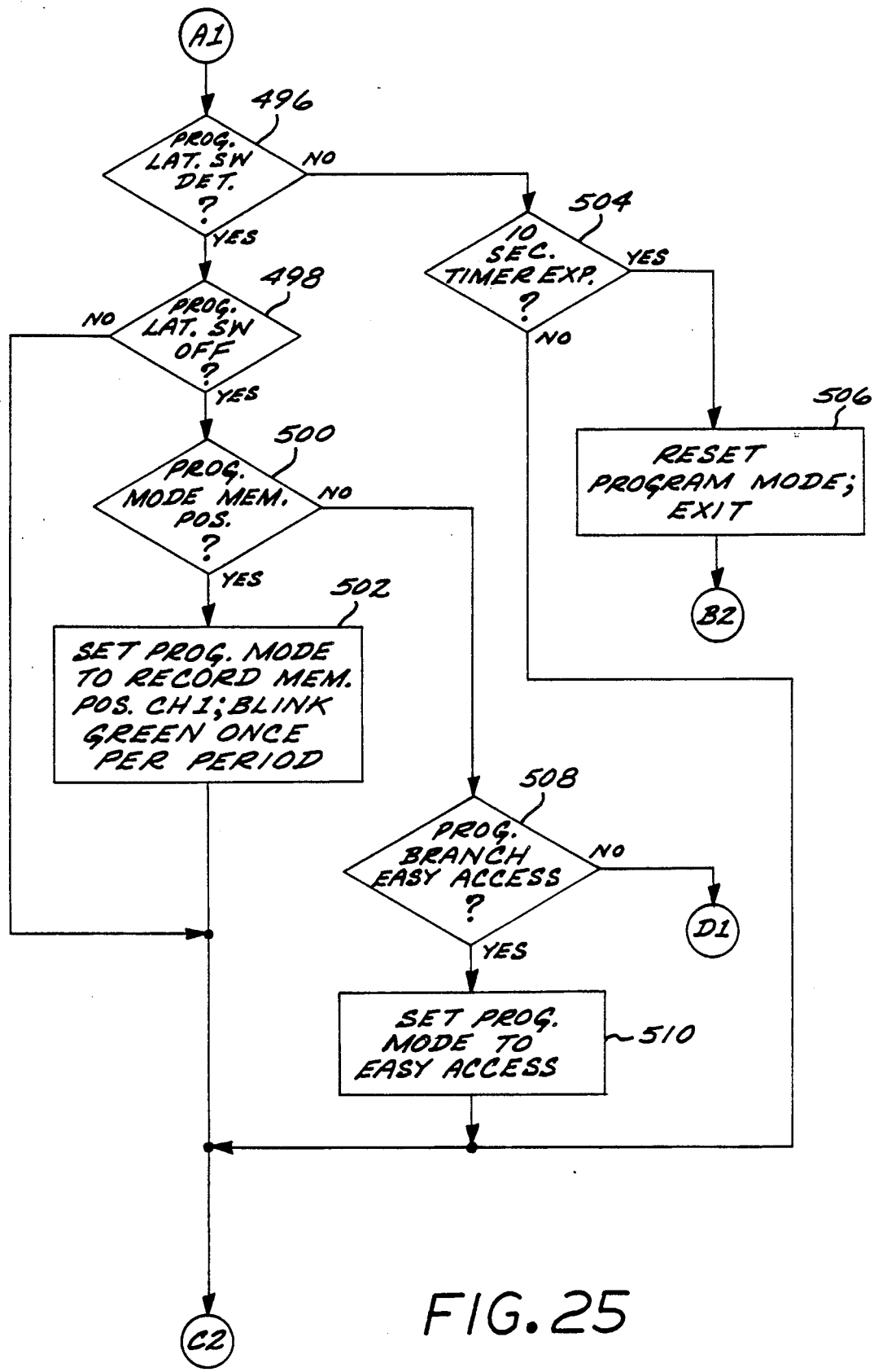

FIG. 22 shows the system operation accessed at node C2. At this point the system has recognized that the programming mode has been selected by the user and a ten second timer has been started. The system is now expecting the user to select a particular programming branch, i.e., the memory seat position branch, the easy access program branch, or the alarm mode program branch. The system enters the program mode in the first branch, i.e., in the memory seat program branch. The program switch (momentary side) is monitored at step 470, and if not on an edge, operation branches to node A1 (FIG. 25). If "on" and an edge are detected, then if the programming operation was in the memory seat position programming branch (step 472), the next branch, the easy access programming branch, is entered (step 474), and operation returns to node C2. If the programming operation is not in the memory seat branch, then at step 476, if the system was set to the "easy access" program branch, the program operation is now set to the "alarm motion" program branch and operation branches to node C2. If the system was not in a selection process for the "easy access" at step 476, program branch operation branches to node B1.

FIG. 25 shows the operation accessed at node A1 (from step 470, FIG. 22). At step 496, if an edge is detected on the signal from the latched side of the program switch and the program switch has been returned to the "off" position (step 498), then at step 500 a decision is made as to whether the system is in a program mode to program the memory seat position. If yes, then at step 502 the system is set to record memory position one, and the green LED is blinked once per period. Operation then branches to node C2. If not in the mode to program a memory position, then at step 508, if the system is in the program branch to program the "easy access" mode, the program mode is set to the easy access mode and operation proceeds to node C2 (FIG. 22). If at step 496 a latched side edge was not detected, at step 504 the ten second timer is checked, and if not timed out, operation proceeds to node C2. If the timer has timed out, the program modes are reset and the program mode is exited (step 506), and operation returns to node B2. At step 500, if not in a mode to program the memory seat function, then at step 508, a decision is made as to whether the system was set in a branch selection mode for the easy access programming branch. If yes, then the program mode is set to the easy access mode, and operation returns to node C2. Otherwise, operation branches to node D1.

Figure 23:
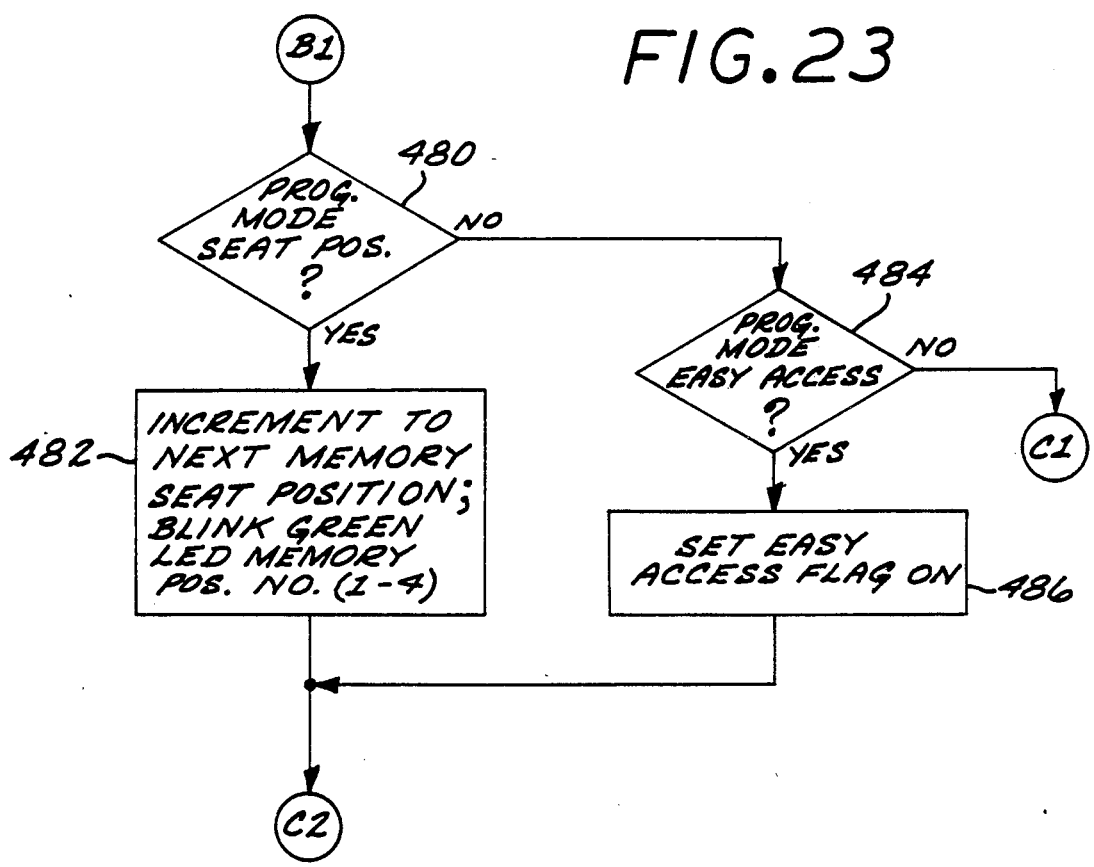

FIG. 23 shows the operation accessed at node B1, from step 476, FIG. 22. At step 480, if the system is in the memory seat position program mode, i.e., to store in memory a seat position corresponding to a particular channel, then at step 482, the memory seat position address pointer is incremented to the next position, and the green LED is blinked a number of times corresponding to the address pointer number (1-4 in this embodiment). Operation then branches to node C2. If the system is not in the memory seat position program mode and is not in the "easy access" program mode (step 484), operation branches to node C1. If in the "easy access" program mode, the flag EASY ACCESS is set, and operation branches to node C2.

Figure 24:
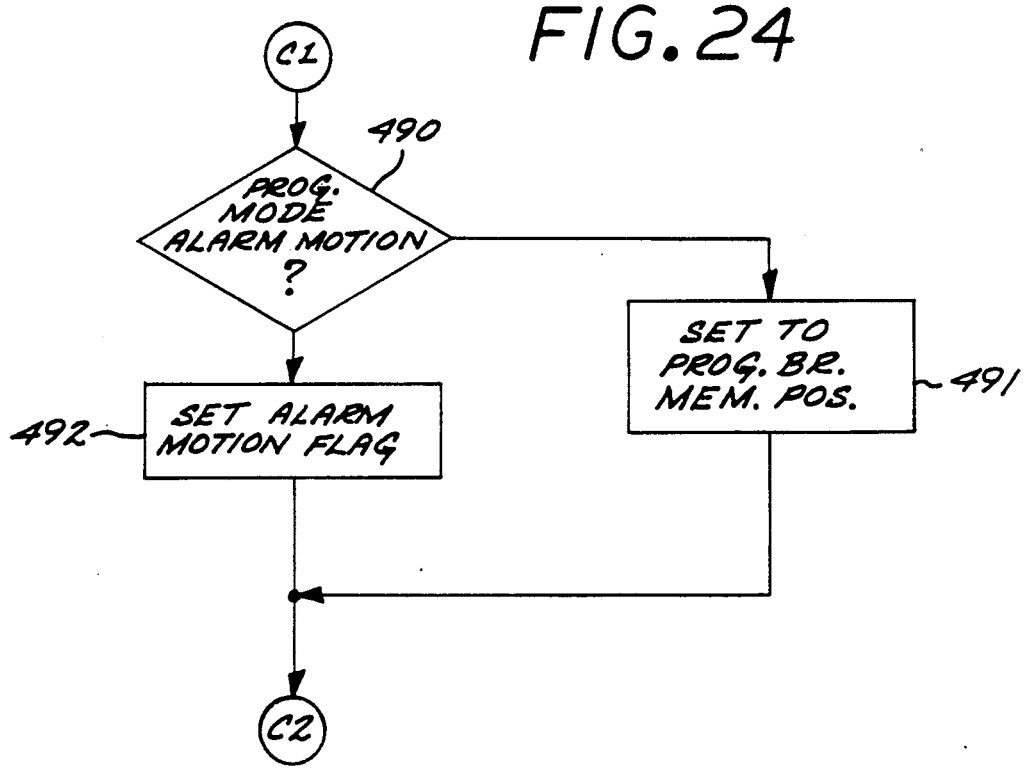

FIG. 24 illustrates the operation accessed from node C1. At step 490, if the system is in the mode to program the alarm motion, then at step 492 the flag ALARM MOTION is set and operation branches to node C2. Otherwise the program branch is set to the memory position branch (step 491), and operation branches to node C2.

Figure 26:
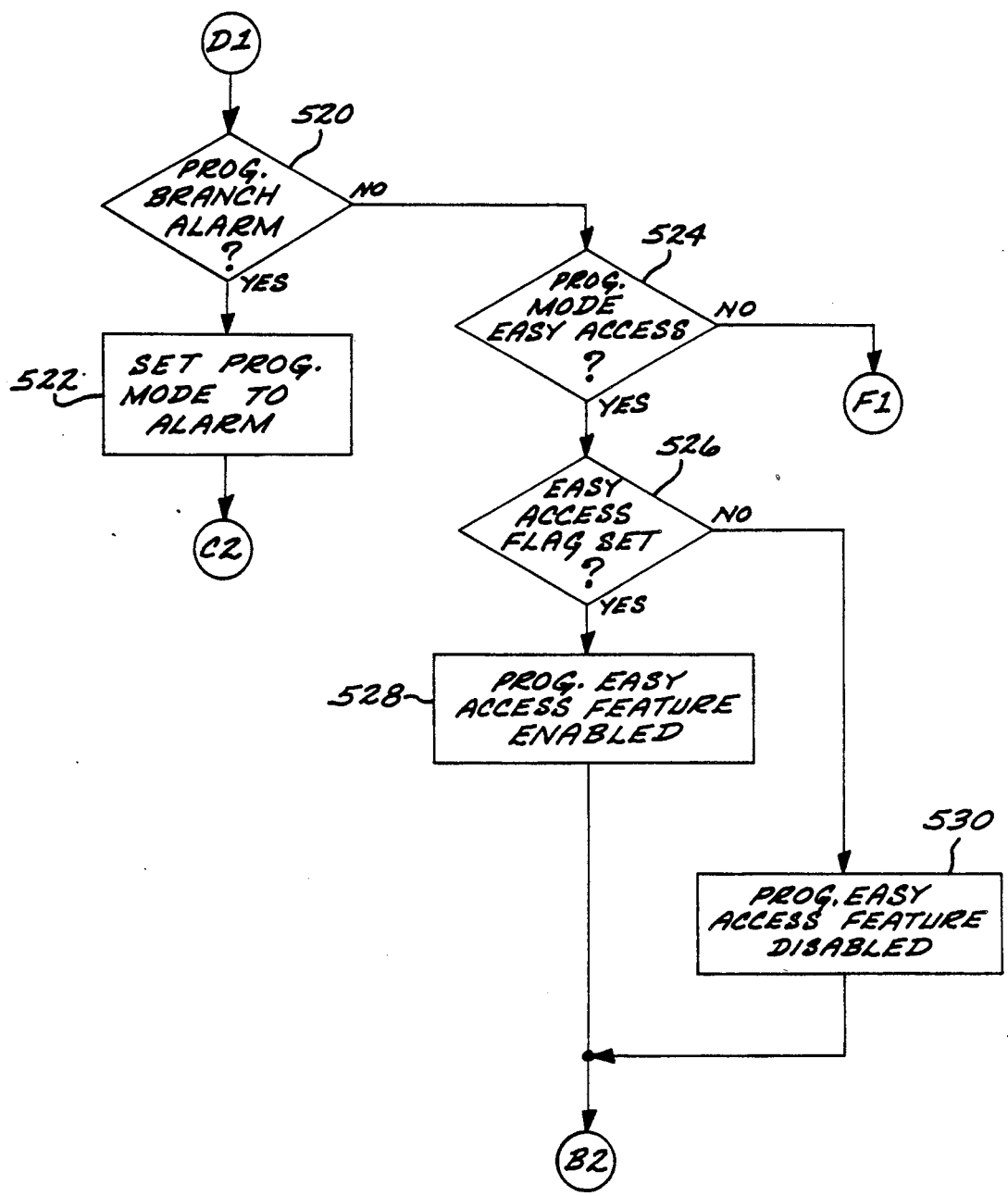

FIG. 26 shows the operation accessed at node D1, from step 508, FIG. 25. At step 520, if the system in the alarm motion program branch, then at step 522 the program mode is set to the alarm motion mode and operation branches to node C2. If not in the alarm motion program branch, then at step 524, if the system is in the easy access program mode, the EASY ACCESS flag is checked (step 526), and if set, the easy access feature is enabled (step 528) and operation branches to node B2. If the flag is not set, then the easy access feature is disabled (step 530) and operation branches to node B2. At step 524, if the system is not in the easy access mode, operation branches to node F1.

Figure 27:
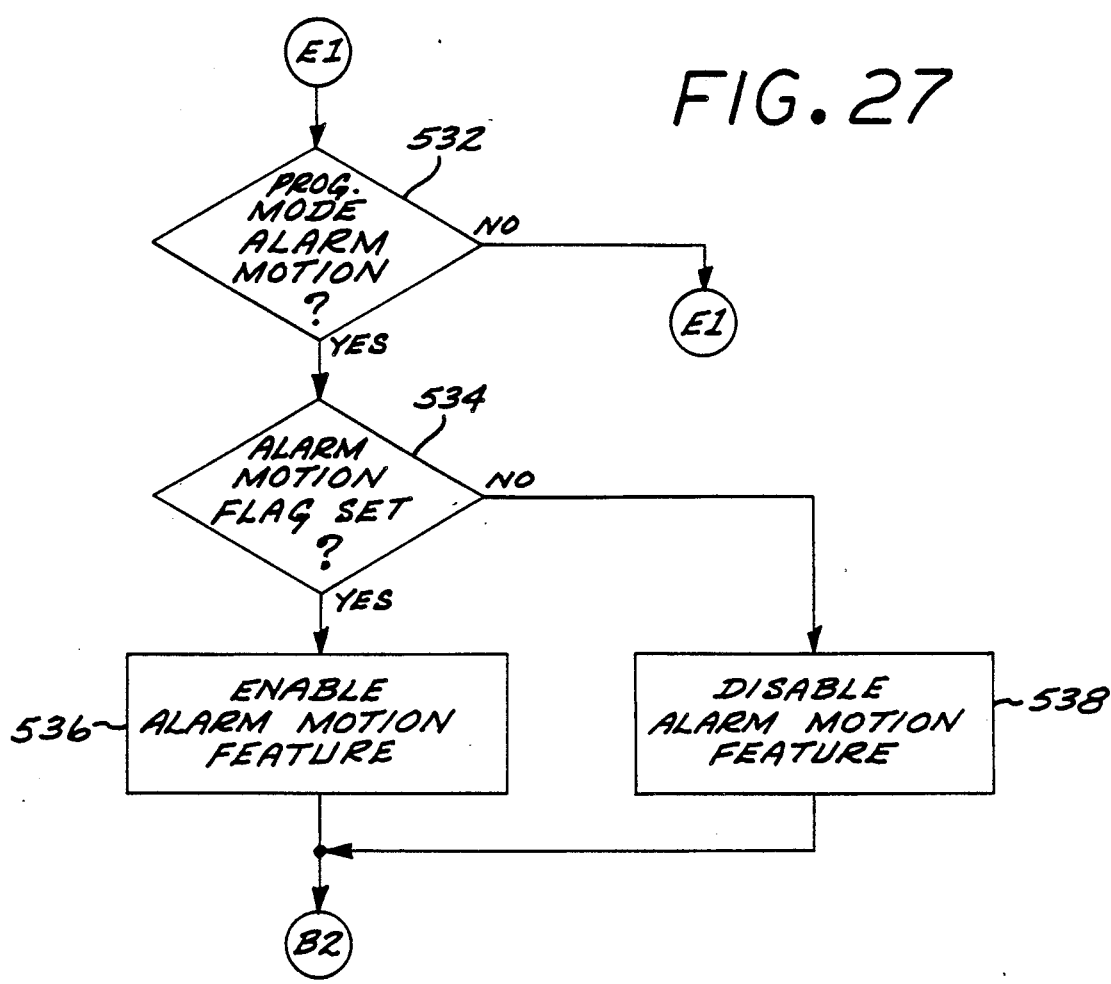

FIG. 27 shows the operation accessed at node F1, from step 524, FIG. 26. At step 532, if the system is not in the alarm motion programming mode, operation branches to node E1. If in the alarm motion programming mode the, ALARM MOTION flag is checked and if set, the alarm motion feature is enabled and operation branches to node B2. If the flag is not set, the alarm motion feature is disabled (step 538) and operation branches to node B2.

Figure 28:
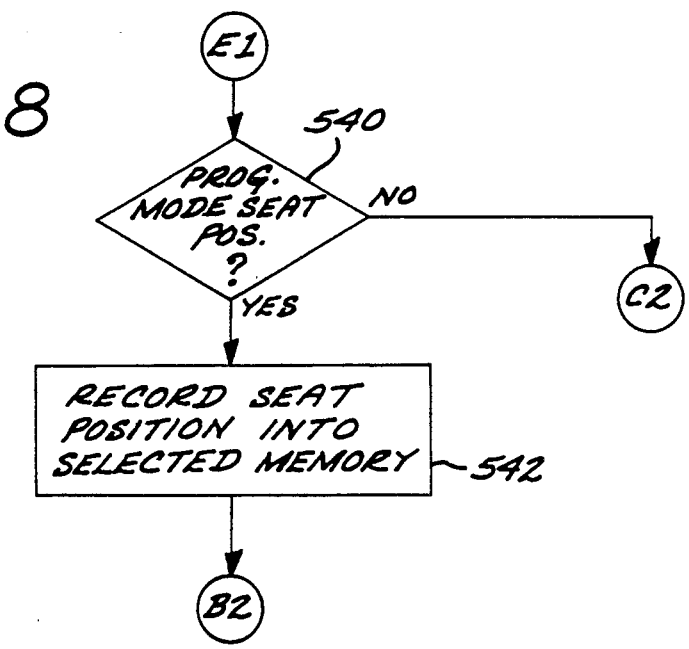

FIG. 28 shows the operation accessed at node E1. At step 540, if not in the memory seat position programming mode, operation branches to node C2. If in this mode, then at step 542 the present seat position is recorded in the selected memory position. Operation then branches to node B2.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. In combination with a vehicle power seating positioning system which does not include a memory seat position function, the power seating positioning system characterized by one or more electrically activated seating positioning means and user actuated seat positioning switches, a remote controlled seating positioning system, comprising:

a user-activated remote control transmitter for transmitting one or more predetermined channel code signals;

means disposed within the vehicle and responsive to received channel code signals for generating receiver code signals indicative that a particular predetermined channel code signal has been received;

a programmable electronic memory;

user programming means for programming in said memory a seat positioning data set defining a particular selected seating position corresponding to a particular selected seating position corresponding to a particular channel code;

a controller responsive to the receiver code signals, and said user programming means for controlling the operation of said electrically activated positioning means and generating electrical seat position control signals for activating and controlling said positioning means, said controller generating said control signals in response to a particular receiver code signal to position said seat at said selected seating position corresponding to said channel code, whereby said seating position may be moved to a desired programmed memory position by actuating the remote control transmitter.

2. The system of claim 1 wherein:

said remote transmitter comprises means for transmitting a selected one of a plurality of predetermined channel codes;

said means for generating receiver code signals is responsive to a plurality of unique channel code signals, and said receiver code signals indicate the particular one of said channel codes which has been received;

said user programming means comprises means for programming in said memory a plurality of said seat position data sets, each data set defining a particular selected seat position corresponding to a particular one of said channel codes;

whereby said seat may be positioned at any one of said plurality of seat memory positions corresponding to the data sets stored in said memory position by actuating the remote control transmitter to transmit the particular channel code corresponding to the desired seat position.

3. The system of claim 1 wherein said vehicle power seating positioning system is further characterized by electrically activated positioning means for positioning the driver's seat and the vehicle steering wheel at selected positions in respective ranges of movement, and wherein said seat positioning data sets define the respective positions of said driver's seat and said steering wheel.

4. The system of claim 1 wherein said useractivated means for generating a predetermined channel code signal comprises a remote control radio frequency transmitter, and said means responsive to said channel code signal comprises a radio frequency receiver for receiving said transmitted code.

5. The system of claim 1 wherein said controller is further responsive to said seat positioning switches, said controller comprising means for actuating said positioning means in response to actuation of said switches.

6. The system of claim 1 wherein said seating positioning system operates in cooperation with a vehicle security system, wherein:

said means responsive to received channel code signals comprises a receiving-decoding means of the security system;

said security system is armed or disarmed by said receiver code signals indicating that a particular predetermined code signal has been received;

said security system further comprises means for generating an alarm signal when the security system is armed and an intrusion event is detected;

said controller further comprises means responsive to said alarm signal for generating predetermined electrical alarm seat position control signals to position the vehicle's driver's seat at an alarm seat position, thereby making it difficult or impossible for an intruder to drive the vehicle.

7. The system of claim 6 wherein said alarm position puts the driver's seat at a position in the seat range of movement having the minimum spacing between the seat and the vehicle dashboard.

8. The system of claim 7 wherein said vehicle security system further comprises a door trigger producing a door trigger signal indicating the open/close status of the vehicle door or doors, and wherein said controller is further responsive to said door trigger signal to generate said alarm seat position control signals upon receipt of said alarm signal only if said vehicle door is closed.

9. The system of claim 6 wherein said power seating positioning system is further characterized by means for extending or retracting the vehicle steering wheel toward or from the vehicle seat in response to steering wheel positioning signals, and wherein said controller is further responsive to said alarm signal for generating predetermined alarm event steering wheel positioning signals for extending said steering wheel toward the vehicle driver's seat, thereby further increasing the difficulty for an intruder to drive the vehicle.

10. The system of claim 6 further comprising means for enabling or disabling the operation of said means responsive to said alarm signal for generating said alarm seating position control signals.

11. The system of claim 1 further comprising means for monitoring the operation of the seat positioning means and providing monitoring signals indicative of said operation, and said controller further comprises means for determining the present position of the seat during operation of the seat positioning means.

12. The system of claim 11 further comprising means for programming said memory with data indicative of the present seat position.

13. The system of claim 1 wherein:

said power seating positioning means comprises at least one electric motor and a motor drive circuit for generating motor drive signals in response to said seat position control signals; and said monitoring means comprises means for sensing rotation of the motor shaft.

14. In combination with a vehicle power seating positioning system including a memory seat position function, the power seating positioning system characterized by one or more electrically activated seating positioning means and user actuated seat positioning switches, a remote controlled seating positioning system, comprising:

a user-activated remote control transmitter for transmitting one or more predetermined channel code signals;

means disposed within the vehicle and responsive to received channel code signals for generating receiver code signals indicative that a particular predetermined channel code signal has been received;

a programmable electronic memory;

user programming means for programming in said memory a seat positioning data set defining a particular selected seating position corresponding to a particular selected seating position corresponding to a particular channel code;

a controller responsive to the receiver code signals and said user programming means for controlling the operation of said electrically activated positioning means and generating electrical seat position control signals for activating and controlling said positioning means, said controller generating said control signals in response to a particular receiver code signal to position said seat at said selected seating position corresponding to said channel code, whereby one or more additional memory seating positions may be provided by actuating the remote control transmitter.

15. A vehicle security system for positioning the vehicle driver's seat in the event of an intrusion event, comprising:

a user-activated means for generating one or more predetermined channel code signals to arm or disarm the vehicle security system;

means disposed in the vehicle and responsive to said received channel code signal for arming or disarming the vehicle security system;

power seat positioning means for positioning the vehicle driver's seat to desired positions throughout a range of movement in response to seat positioning signals;

alarm activating means comprising means for detecting the occurrence of an intrusion event and generating an alarm signal when the vehicle security system is armed and in the event an intrusion event is detected; and a controller comprising means responsive to said alarm signal for generating predetermined alarm event seat positioning signals, said positioning signals for positioning the vehicle driver's seat at an alarm seat position making it difficult or impossible for an intruder to drive the vehicle.

16. The system of claim 15 wherein said alarm position is the driver's seat position in the seat range of movement having the minimum spacing between the seat and the vehicle dashboard.

17. The system of claim 15 wherein said alarm activating means comprises a door trigger producing a door trigger signal indicating the open/close status of the vehicle door or doors, and wherein said controller is further responsive to said door trigger signal to generate said alarm event positioning signals upon receipt of said alarm signal only if said vehicle door is closed upon receipt of said alarm signal.

18. The system of claim 15 further comprising power actuated means for extending or retracting the vehicle steering wheel toward or from the vehicle driver seat in response to steering wheel positioning signals, and wherein said controller further comprises means responsive to said alarm signal for generating predetermined alarm event steering wheel positioning signals for extending said steering wheel toward the vehicle driver's seat, thereby further increasing the difficulty for an intruder to drive the vehicle.

19. The system of claim 15 wherein said controller means is further responsive to the disarming of said vehicle security system to generate preset seat positioning signals to position the seat at a pre-selected position.

20. The system of claim 15 wherein said useractivated means for generating a predetermined channel code signal comprises a remote control radio frequency transmitter, and said means responsive to said channel code signal comprises a radio frequency receiver for receiving said transmitted code.

21. The system of claim 20 wherein:

said remote control transmitter comprises a multichannel transmitter for selectively transmitting one of a plurality of channel codes, and wherein a first one of said channel codes is for arming or disarming said alarm system, and wherein a second one of said channel codes is for positioning the vehicle driver seat to a pre-set seat position associated with said second code;

said receiver is responsive to receipt of said first code to generate a first received code signal and to receipt of said second code to generate a second received code signal;

said means for arming or disarming the security system acts in response to receipt of said first received code signal; and said controller comprises means responsive to said second received code signal to generate pre-set memory seat positioning signals to position the driver seat at a predetermined location corresponding to said second channel signal.

22. The system of claim 15 further comprising programmable means for enabling or disabling the operation of said means responsive to said alarm signal for generating predetermined alarm event seat positioning signals.

23. The system of claim 15 wherein said useractivated means comprises a remote control radio frequency transmitter, and said controller further comprises means responsive to the disarming of said security system to generate easy access seat positioning signals to position the driver's seat at a position relatively distant from the vehicle dashboard to facilitate ease of entry into the vehicle.

24. The system of claim 23 wherein the vehicle is characterized by an ignition switch having on and off positions, the system further comprising means for sensing the on/off status of the vehicle ignition switch and generating an ignition status signal indicative of the on/off status of said switch, and wherein said controller further comprises means responsive to said ignition status signal to generate a seat driving position signal to move said driver's seat from the "easy access" position to a predetermined driving position.

25. The system of claim 23 further comprising programmable means for enabling or disabling the operation of said means responsive to the disarming of the said security system to generate easy access seat positioning signals.

26. The system of claim 15 wherein said power seat positioning means comprises:

at least one electric motor;

a motor drive circuit for generating motor drive signals in response to said seat positioning signals;

means for determining the present relative position of said seat.

27. The system of claim 15 wherein said system further comprises:

manually actuated seat position switches disposed within the vehicle and accessible to the driver for providing seat switch signals;

said controller being selectively responsive to said seat switch signals to provide seat positioning signals to move the driver seat in response to said seat switch signals.

28. The system of claim 27 wherein said controller is responsive to said seat switch signals only when the vehicle security system is disarmed, whereby the driver's seat position may not be moved by actuation of the seat position switches when the security system is armed.

29. The system of claim 27 further comprising means for selectively providing electrical power to said controller in response to the change of the arm/disarm state of said security system or in response to receipt of said seat switch signals, whereby said controller is powered down except when said security system changes states or said seat switch signals are received.

30. A vehicle security system having the capability of controlling the driver's seating position, comprising:
a user-activated remote control transmitter unit for generating one or more predetermined channel code signals to arm or disarm the vehicle security system;
means disposed in the vehicle and responsive to received channel code signals for arming or disarming the vehicle security system;
power seat positioning means for positioning the vehicle driver's seat to desired positions throughout a range of movement in response to seat positioning signals; and
controller means responsive to the disarming of said security system through use of the remote transmitter for generating easy access positioning signals for positioning the driver's seat at a predetermined easy access position to facilitate the driver's entry into the seated position.

31. The system of claim 30 wherein said easy access position is the driver's seat position in the seat range of movement having the maximum spacing between the seat and the vehicle dashboard.

32. The system of claim 30 further comprising power actuated means for extending or retracting the vehicle steering wheel toward or from the vehicle driver seat in response to steering wheel positioning signals, and wherein said controller further comprises means responsive to the disarming of said security system for generating predetermined easy access steering wheel positioning signals for extending said steering wheel toward the vehicle dashboard, thereby facilitating the driver's entry into the driver's seat.

33. The system of claim 30 wherein:
said remote control transmitter comprises a multi-channel transmitter for selectively transmitting one of a plurality of channel codes, and wherein a first one of said channel codes is for arming or disarming said alarm system, and wherein a second one of said channel codes is for positioning the vehicle driver seat to a pre-set seat position associated with said second code;
said means responsive to received channel code signals is responsive to receipt of said first code to generate a first received code signal and to receipt of said second code to generate a second received code signal;
said means for arming or disarming the security system acts in response to receipt of said first received code signal; and
said controller comprises means responsive to said second received code signal to generate pre-set memory seat positioning signals to position the driver seat at a predetermined location corresponding to said second channel signal.

34. The system of claim 30 further comprising programmable means for enabling or disabling the operation of said means responsive to said disarming of said security system for generating easy access positioning signals.

35. The vehicle security system of claim 30 wherein the vehicle is further characterized by an ignition switch, the system further comprising:
an ignition switch sense circuit for sensing the on/off status of the switch and generating a status signal indicative of the on/off status of the ignition switch; and
wherein said controller is further responsive to the ignition sense signal for generating preset seat positioning signals to position the seat at a preselected position in response to the change in status of the ignition switch from the "off" to the "on" state, and to generate said easy access positioning signals in response to the change in status of the ignition switch from the "on" state to the "off" state.

36. A remote controlled seat positioning system for vehicles, comprising:
a user-activated remote control transmitter unit for generating one or more predetermined channel code signals;
means disposed in the vehicle responsive to predetermined received channel code signals for generating received code signals indicating that said predetermined code signal has been received;
power seat positioning means for positioning the vehicle driver's seat to desired positions throughout a range of movements in response to seat positioning signals;
controller means responsive to the received code signal for generating easy access positioning signals for positioning the driver's seat at a predetermined easy access position to facilitate the driver's entry into the seated position.

37. The system of claim 36 wherein said easy access position is the driver's seat position in the seat range of movement having the maximum spacing between the seat and the vehicle dashboard.

38. The system of claim 36 further comprising power actuated means for extending or retracting the vehicle steering wheel toward or from the vehicle driver seat in response to steering wheel positioning signals, and wherein said controller further comprises means responsive to the received code signal for generating predetermined easy access steering wheel positioning signals for retracting said steering wheel toward the vehicle dashboard, thereby facilitating the driver's entry into the driver's seat.

39. The system of claim 36 wherein the vehicle is further characterized by an ignition switch, and the system further comprises:
an ignition switch sense circuit for sensing the on/off status of the switch, and generating a status signal indicative of the on/off status of the ignition switch;
and wherein said controller is further responsive to the ignition sense signal for generating preset seat positioning signals to position the seat at a preselected position in response to the change in status of the ignition switch from the "off" state to the "on" state, and to generate said easy access positioning signal in response to the change in status of the ignition switch from the "on" state to the "off" state.

* * * * *